US007433130B2

(12) United States Patent
Sugita

(10) Patent No.: US 7,433,130 B2

(45) Date of Patent: Oct. 7, 2008

(54) ZOOM LENS AND IMAGE PROJECTION APPARATUS HAVING SAME

(75) Inventor: Shigenobu Sugita, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/755,949

(22) Filed: May 31, 2007

(65) Prior Publication Data

US 2007/0285802 A1 Dec. 13, 2007

(30) Foreign Application Priority Data

Jun. 8, 2006 (JP) ............................ 2006-159658

(51) Int. Cl.
*G02B 15/14* (2006.01)

(52) U.S. Cl. ...................................... 359/679; 359/676

(58) Field of Classification Search ................. 359/676, 359/679, 680, 681, 682
See application file for complete search history.

(56) References Cited

U.S. PATENT DOCUMENTS 6,204,976 B1 3/2001 Nagahara
6,831,706 B2 12/2004 Abe et al.
6,985,302 B2 1/2006 Nishida
7,016,118 B2 3/2006 Wada
7,289,281 B1 * 10/2007 Sugita ........................ 359/797
2003/0234984 A1 12/2003 Nagahara
2007/0195427 A1 * 8/2007 Sugita ........................ 359/692

FOREIGN PATENT DOCUMENTS

JP 2000-275519 10/2000
JP 2004-070306 3/2004
JP 2004-245882 9/2004
JP 2005-062225 3/2005

* cited by examiner

*Primary Examiner*—David N Spector
(74) *Attorney, Agent, or Firm*—Morgan & Finnegan LLP

(57) ABSTRACT

A zoom lens telecentric on a reduction side includes a first negative lens, a second negative lens and a first positive lens arranged from the enlargement side to the reduction side. At least one of the first and second negative lenses has an aspherical surface. The zoom lens satisfies $-f12/fw<1.4$, $-f12/(Hwpn-f12)<0.6$ and $|dn/dt|<1.0\times10^{-5}$, where f12 is the focal length of the combined optical system composed of the first and second negative lenses, Hwpn is the distance from the rear principal point of the combined optical system composed of the first and second negative lenses to the front principal point of the first positive lens, dn/dt is a change in the refractive index of the material of which said one negative lens is made relative to a change in its temperature from 25° C., and fw is the focal length of the entire lens system at the wide angle end.

14 Claims, 13 Drawing Sheets

LCD
GB
G61
G53
G52
G51
G42
G41
L6
L5
L4
STO
G31
L3
PL
G21
L2
G12
G11
L1
WIDE ANGLE END
TELEPHOTO END
S

LCD
GB
G61
G53
G52
G51
G42
G41
STO
G31
G21
G13
G12
G11
L1
L2
L3
L4
L5
L6
PL
S
WIDE ANGLE END
TELEPHOTO END

LCD
GB
G61
G55
L6
G54
G53
L5
G52
G51
STO
G41
L4
G31
L3
PL
G21
L2
G12
G11
L1
WIDE ANGLE END
TELEPHOTO END
S

LCD
GB
G61
L6
G55
G54
G53
L5
G52
G51
STO
L4
G41
PL
G31
L3
G21
L2
G12
G11
L1
WIDE ANGLE END
TELEPHOTO END
S

ZOOM LENS AND IMAGE PROJECTION APPARATUS HAVING SAME

BACKGROUND OF THE INVENTION

1. Field of the Invention

The present invention relates to a zoom lens.

2. Description of the Related Art

In the past, there has been developed various zoom lenses for use in liquid crystal projectors (image projection apparatuses) that use a display element such as a liquid crystal display and project an image formed on the display element onto a screen.

Zoom lenses used in liquid crystal projectors are required to be able to project a large image at a short projection distance and to project a clear image. Thus, the zoom lenses for liquid crystal projectors are required to have a large field angle and high resolution, and particularly not to suffer from significant color drift (shift) or lateral chromatic aberration.

Illumination light source means in such projectors generate heat, which causes an increase in the ambient temperature. So it is demanded that optical characteristics of zoom lenses used in projectors do not change greatly with environmental changes, in particular, the focus state do not change significantly.

As a zoom lens for use in a projector, a negative-lead-type zoom lens in which a negative lens unit is arranged on the enlargement side in order to make the field angle wide (see U.S. Patent Application Publication No. 2003/0234984 and U.S. Pat. No. 6,204,976).

There is a known zoom lens for a projector in which, especially lateral chromatic aberration, among various aberrations, is excellently corrected to reduce color drift (shift) to thereby enhance optical performance (see U.S. Pat. No. 7,016,118).

An effective way of providing high definition projection images easily is to use in the zoom lens an aspherical lens made of a plastic material.

However, optical characteristics of aspherical lenses made of plastic materials change significantly depending on environmental changes. In view of this, in known zoom lens, an aspherical lens made of a glass material is used to provide high definition projection images (see U.S. Pat. No. 6,985,302).

In recent years, it is strongly demanded that zoom lenses used in liquid crystal projectors have a wide field angle, be telecentric on the reduction side and have excellent optical performance throughout the zoom range.

It is also demanded that changes in the optical characteristics, in particular focus changes be small even when environmental changes occur.

To meet such demands, it is desirable that the type of the zoom lens, the configuration of each lens unit, and the material of each lens be designed suitably.

SUMMARY OF THE INVENTION

According to one aspect of the invention, a zoom lens telecentric on a reduction side includes, in the mentioned order from the enlargement side to the reduction side, a first negative lens, a second negative lens and a first positive lens, wherein at least one negative lens among the first negative lens and the second negative lens has an aspherical surface, and the zoom lens satisfies:

$$-f12/fw<1.4,$$

$$-f12/(Hwpn-f12)<0.6, \text{ and}$$

$$|dn/dt|<1.0\times10^{-5},$$

where f12 is the focal length of the combined optical system composed of the first negative lens and the second negative lens, Hwpn is the distance from the rear principal point of the combined optical system composed of the first negative lens and the second negative lens to the front principal point of the first positive lens, dn/dt is a change in the refractive index of the material of which said one negative lens is made relative to a change in its temperature from 25° C., and fw is the focal length of the entire lens system at the wide angle end.

According to another aspect of the invention, an image projection apparatus includes a display unit that forms an original image and the above described zoom lens that projects the original onto a projection surface.

According to another aspect of the invention, an image pickup apparatus includes a solid state image pickup element and the above described zoom lens that forms an image of an object on the solid state image pickup element.

Further features of the present invention will become apparent from the following description of exemplary embodiments with reference to the attached drawings.

DESCRIPTION OF THE EMBODIMENTS

The present invention provides a zoom lens (suitable for use in, for example, a liquid crystal projector) that has an excellent optical performance throughout the zoom range and does not suffer from significant changes in optical characteristics upon changes in environmental conditions nor significant aberration variations upon zooming.

A zoom lens according to one aspect of a plurality of embodiments of the present invention that will be described later is characterized as follows. First, the zoom lens is telecentric on the reduction side and has a first negative lens, a second negative lens and a first positive lens. At least one of the first and second negative lenses has an aspherical surface. In this zoom lens, the following conditions are satisfied $$-f12/fw<1.4 \quad (1)$$

$$-f12/(Hwpn-f12)<0.6 \quad (2)$$

$$|dn/dt|<1.0\times10^{-5} \quad (3)$$

where f12 is the focal length of the composite lens system composed of the first negative lens and the second negative lens, Hwpn is the distance between the rear principal point of the composite lens system composed of the first negative lens and the second negative lens and the front principal point of the first positive lens, dn/dt is a change in the refractive index of the material of the aforementioned one of the negative lenses relative to a change in the temperature from 25° C., and fw is the focal length of the entire lens system at the wide angle end.

Here, the reduction side refers to the reduction conjugate side, that is, the original side (or the panel side) in the case of a projector, and the photoelectric transducer side (or the film side) in the case of an image pickup apparatus (e.g. a camera). The side opposite to the reduction side will be referred to as the enlargement side or the enlargement conjugate side.

By the above features, the problems described before can be solved, and the object of the present invention can be achieved. The specific embodiments that will be described in the following with reference to the accompanying drawings are mere exemplary arrangements that are desirable in solving the above described problems and other problems, but their specific features are not necessarily essential to the present invention.

In the following, embodiments of the zoom lens and the image projection apparatus and the image pickup apparatus having the same according to the present invention will be described.

Figure 1:
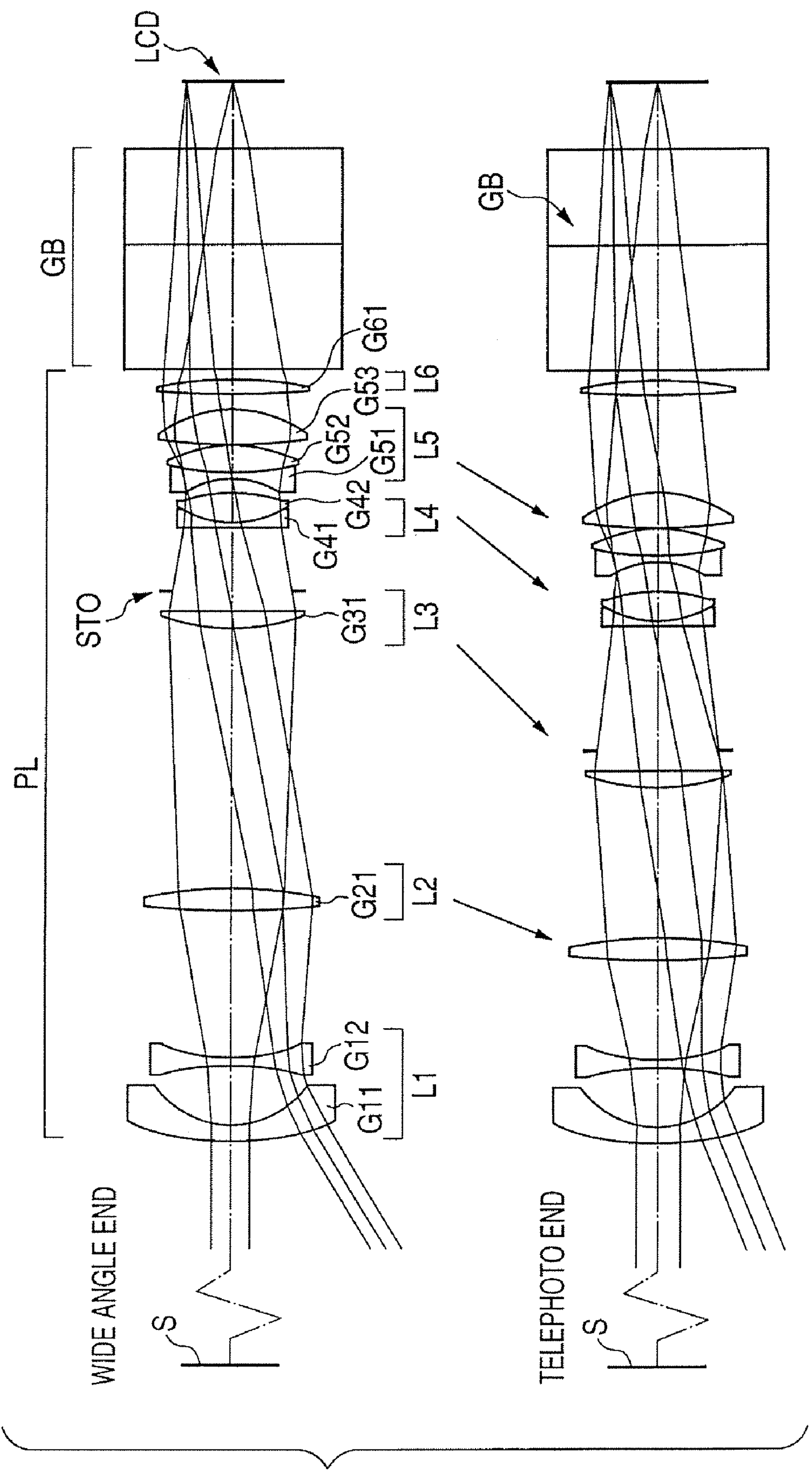
FIG. 1 schematically illustrates the relevant portions of an image projection apparatus having a zoom lens according to a first embodiment.

FIG. 1 illustrates the relevant portions of an image projection apparatus (a liquid crystal video projector) using a zoom lens according to a first embodiment at the wide angle end and at the telephoto end, respectively.

Figure 2:
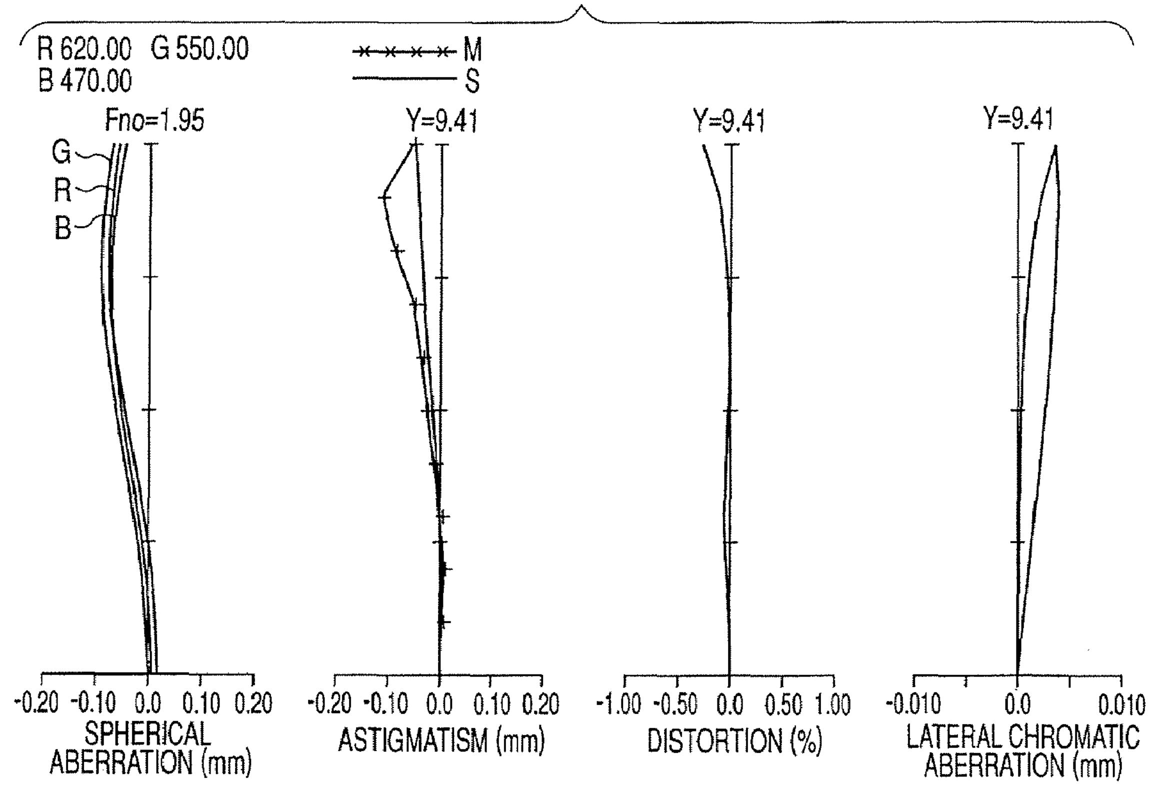
FIG. 2 shows aberrations of the zoom lens according to the first embodiment at the wide angle end.
Figure 3:
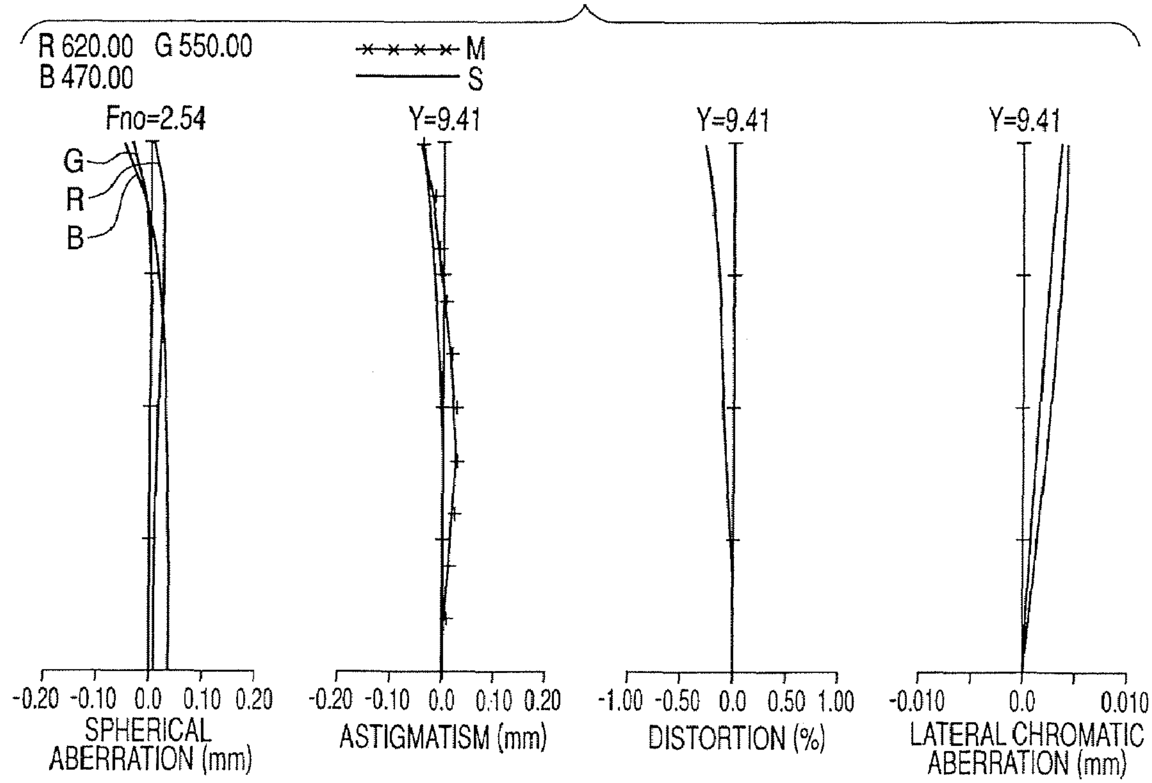
FIG. 3 shows aberrations of the zoom lens according to the first embodiment at the telephoto end.

FIGS. 2 and 3 show aberrations in the first embodiment at a screen distance (distance from the first lens unit to the screen) of 1890 mm at the wide angle end (or the shortest focal length position) and the telephoto end (the longest focal length position), respectively.

Figure 4:
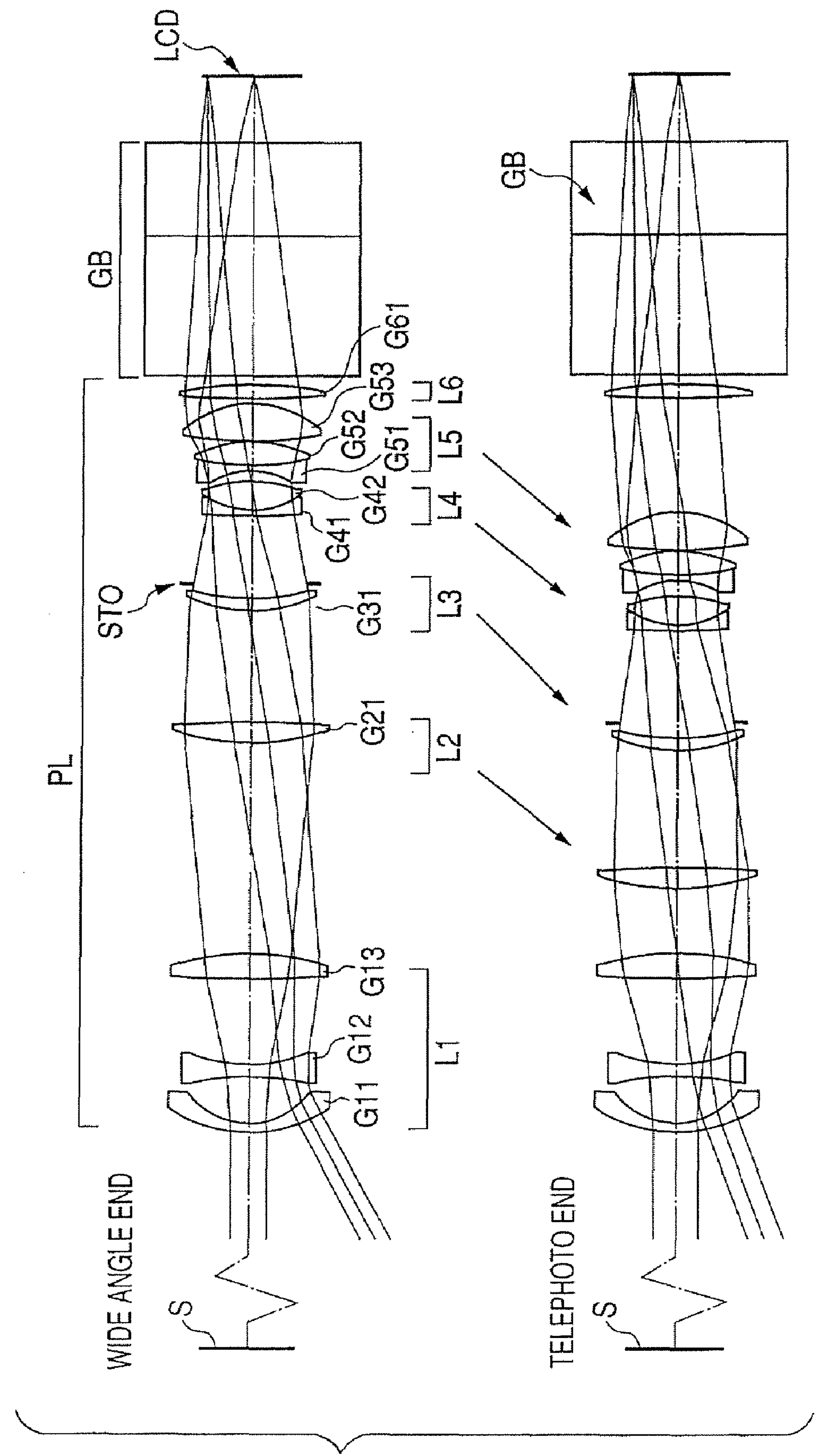
FIG. 4 schematically illustrates the relevant portions of an image projection apparatus having a zoom lens according to a second embodiment.

FIG. 4 illustrates the relevant portions of an image projection apparatus using a zoom lens according to a second embodiment at the wide angle end and at the telephoto end, respectively.

Figure 5:
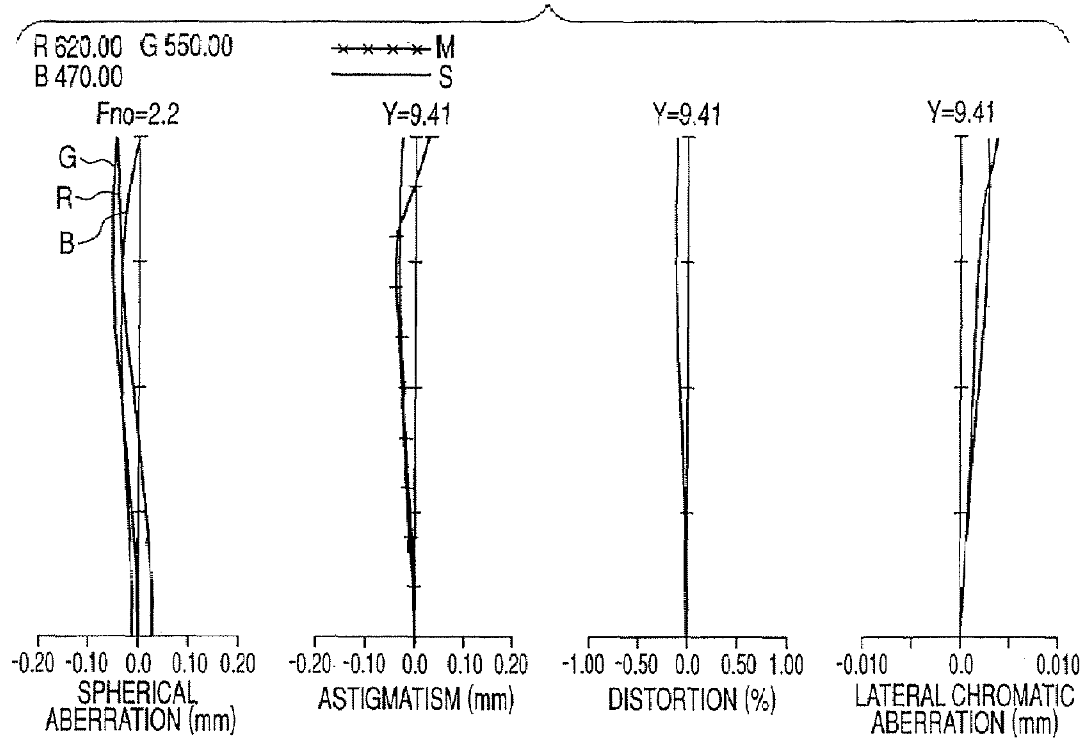
FIG. 5 shows aberrations of the zoom lens according to the second embodiment at the wide angle end.
Figure 6:
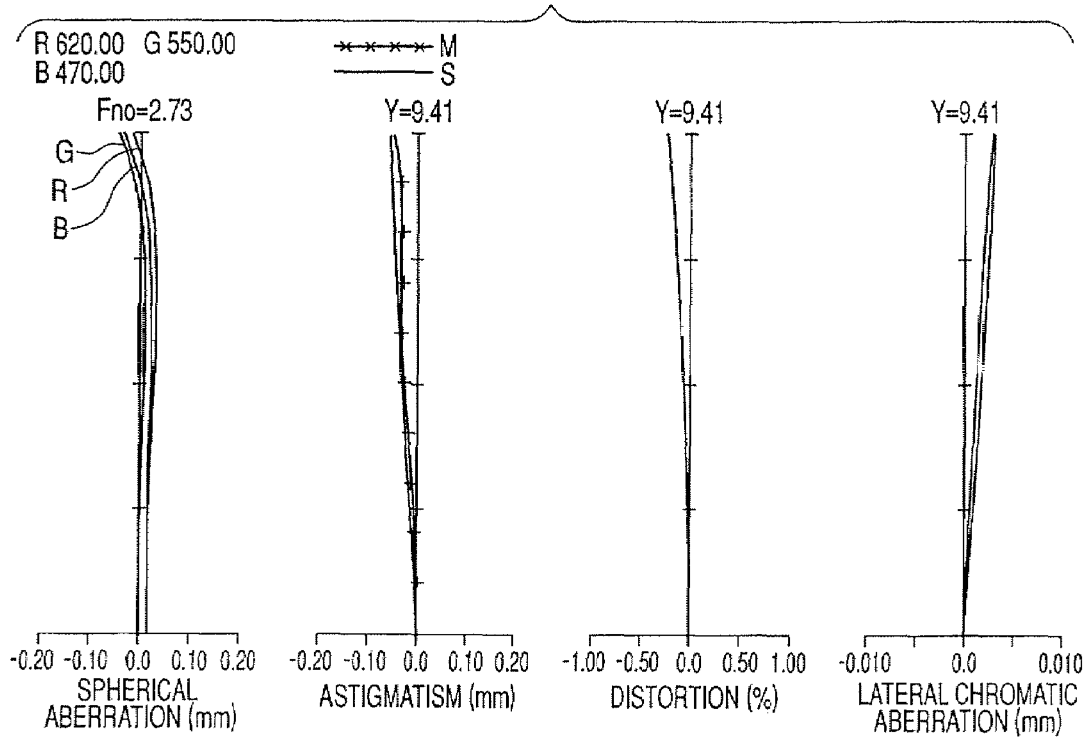
FIG. 6 shows aberrations of the zoom lens according to the second embodiment at the telephoto end.

FIGS. 5 and 6 show aberrations in the second embodiment at a screen distance of 1890 mm at the wide angle end and the telephoto end, respectively.

Figure 7:
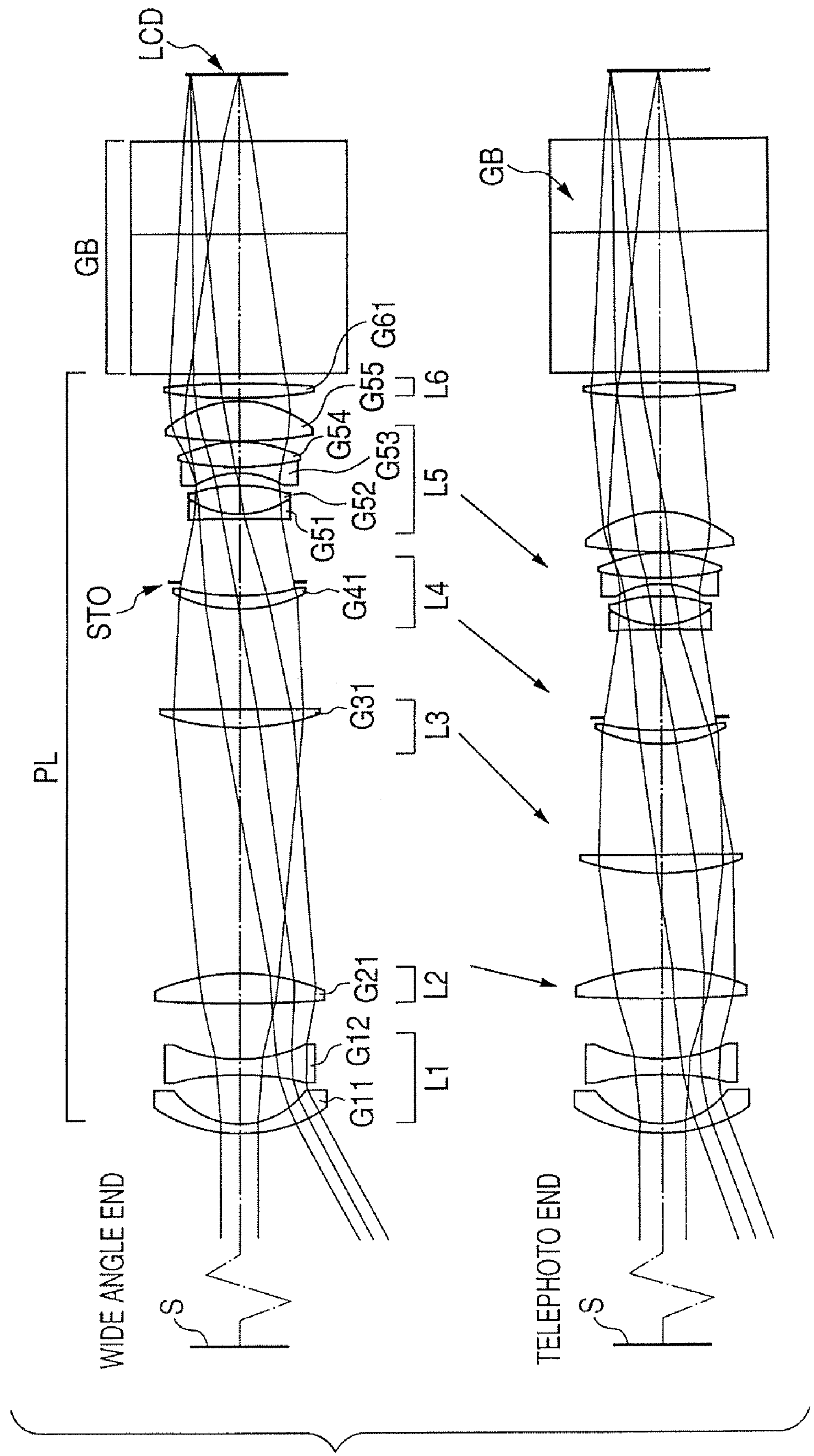
FIG. 7 schematically illustrates the relevant portions of an image projection apparatus having a zoom lens according to a third embodiment.

FIG. 7 illustrates the relevant portions of an image projection apparatus using a zoom lens according to a third embodiment at the wide angle end and at the telephoto end, respectively.

Figure 8:
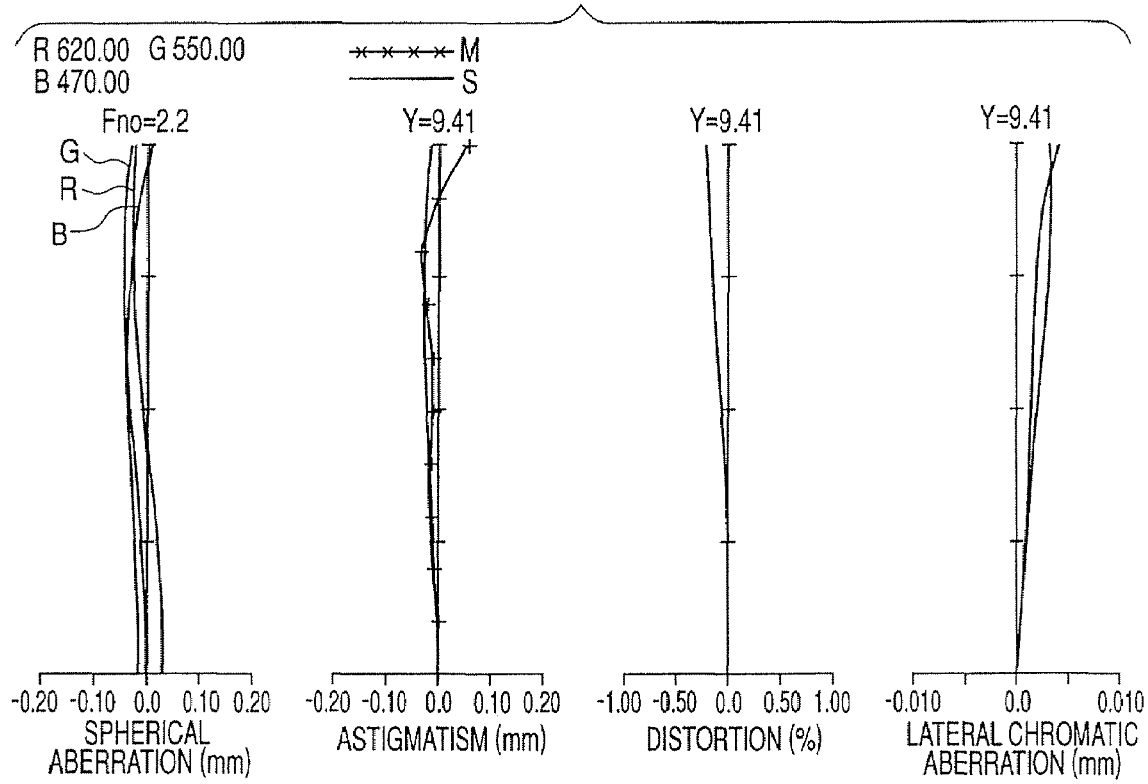
FIG. 8 shows aberrations of the zoom lens according to the third embodiment at the wide angle end.
Figure 9:
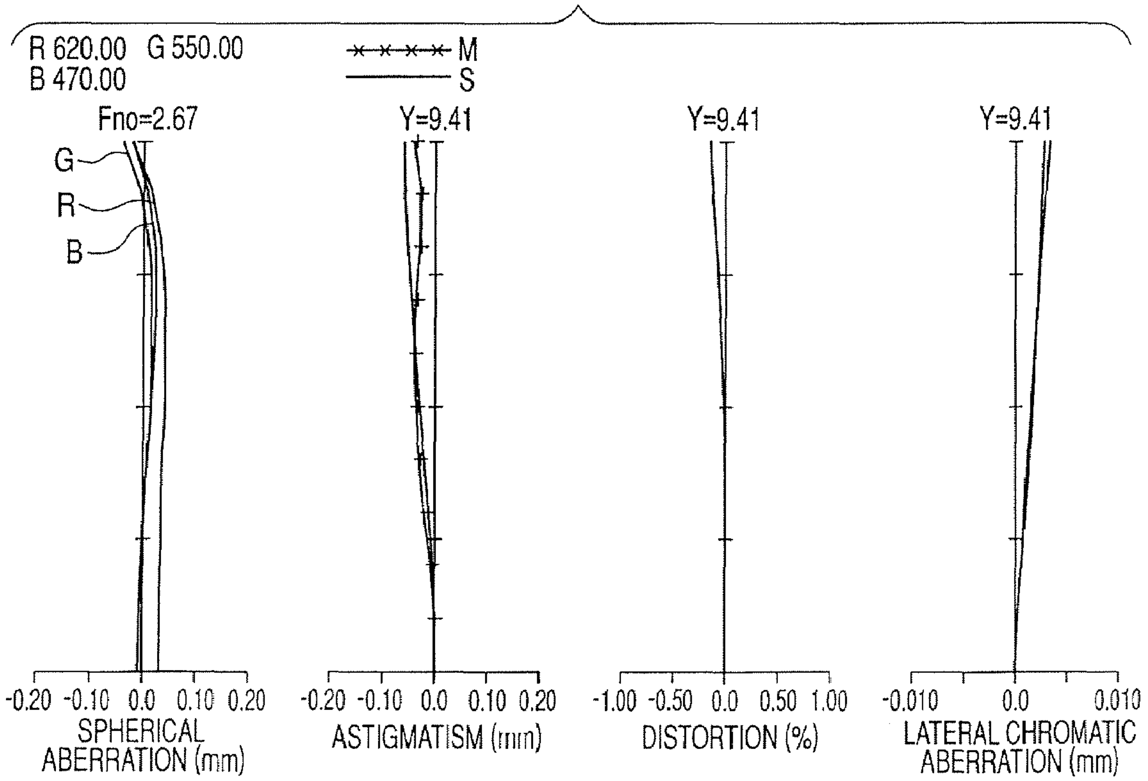
FIG. 9 shows aberrations of the zoom lens according to the third embodiment at the telephoto end.

FIGS. 8 and 9 show aberrations in the third embodiment at a screen distance of 2100 mm at the wide angle end and the telephoto end, respectively.

Figure 10:
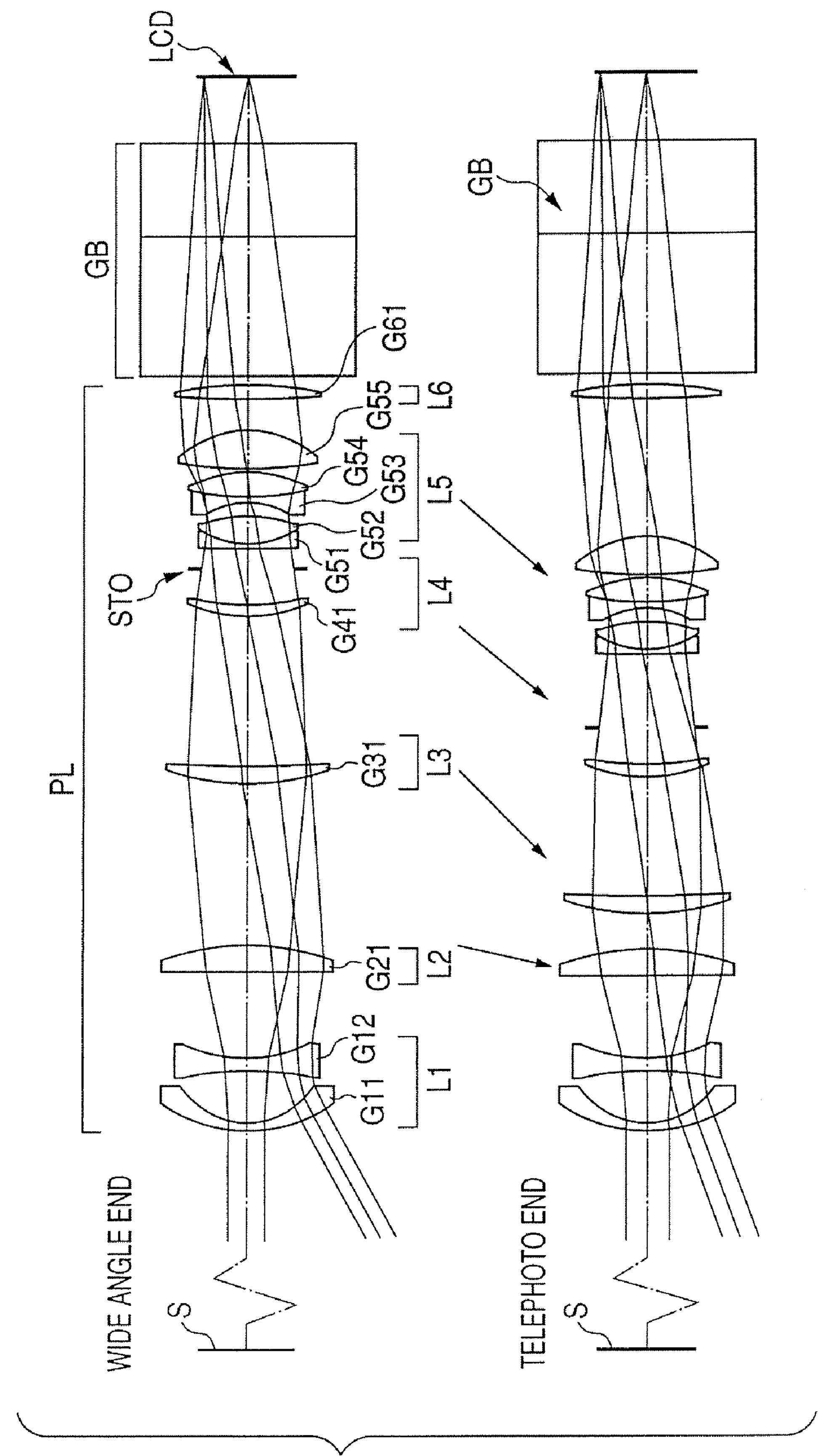
FIG. 10 schematically illustrates the relevant portions of an image projection apparatus having a zoom lens according to a fourth embodiment.

FIG. 10 illustrates the relevant portions of an image projection apparatus using a zoom lens according to a fourth embodiment at the wide angle end and at the telephoto end, respectively.

Figure 11:
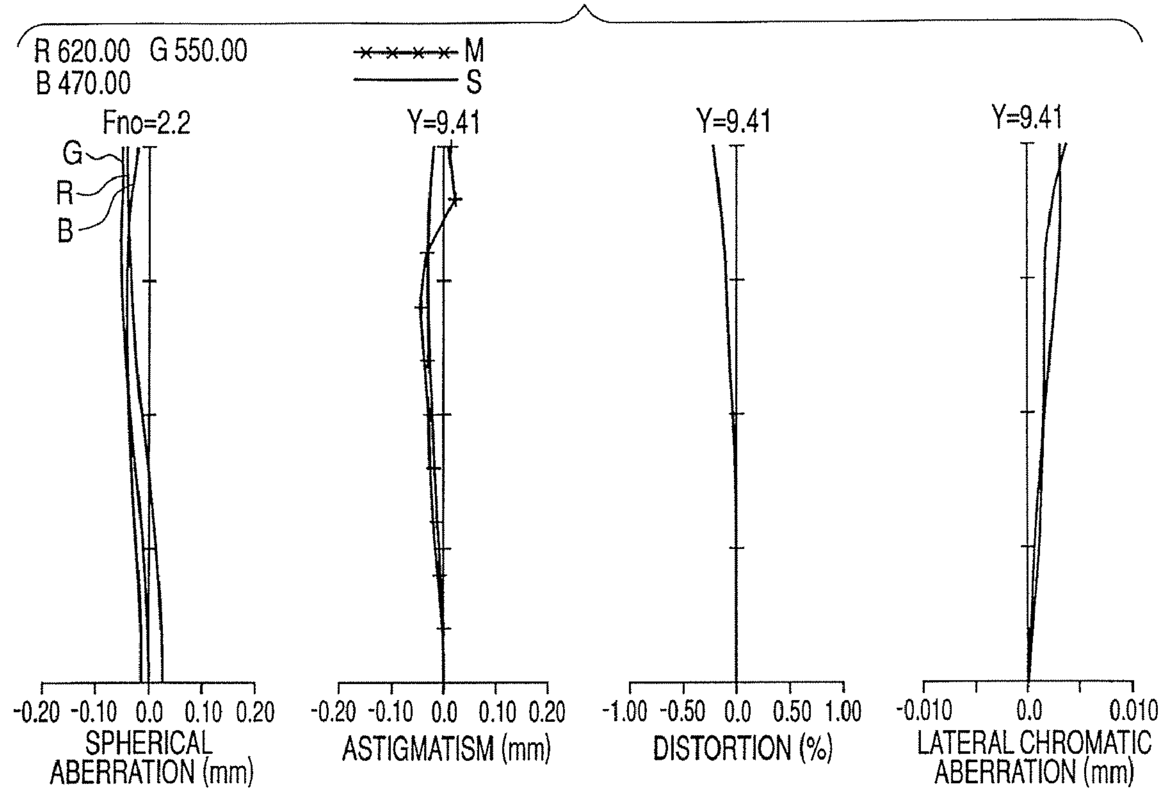
FIG. 11 shows aberrations of the zoom lens according to the fourth embodiment at the wide angle end.
Figure 12:
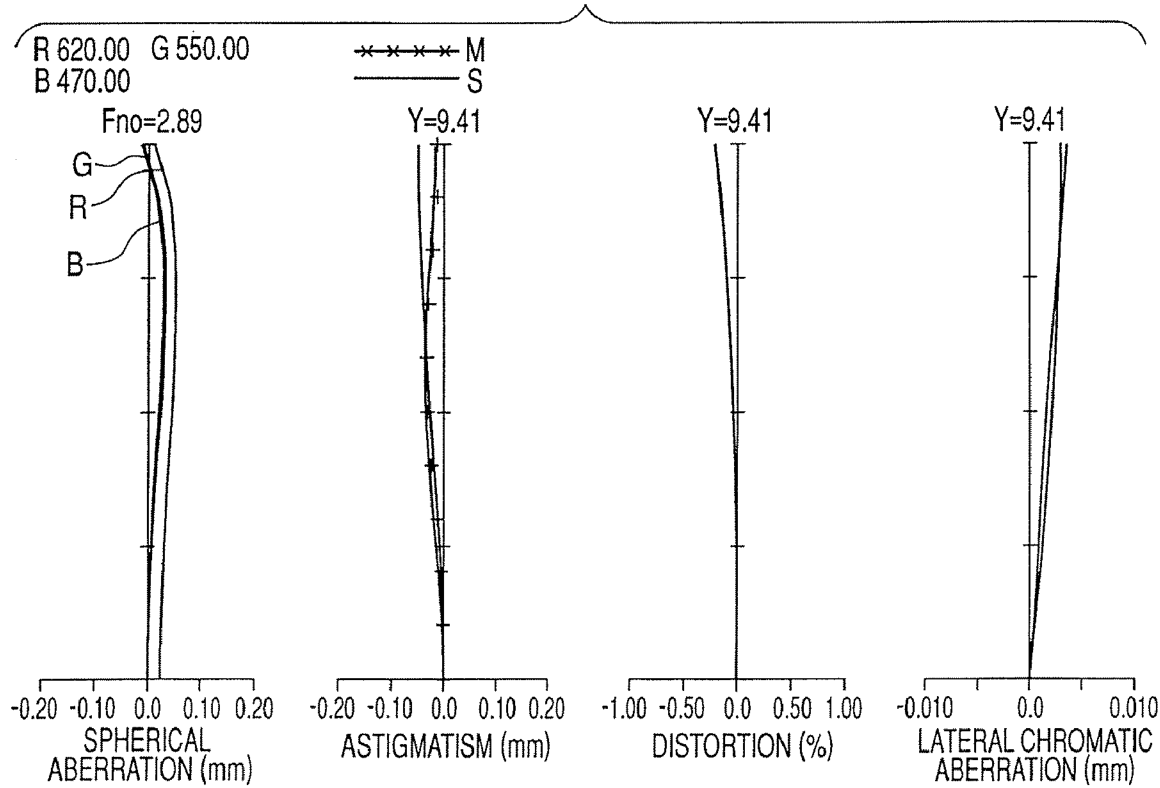
FIG. 12 shows aberrations of the zoom lens according to the fourth embodiment at the telephoto end.

FIGS. 11 and 12 show aberrations in the fourth embodiment at a screen distance of 2100 mm at the wide angle end and the telephoto end, respectively.

Figure 13:
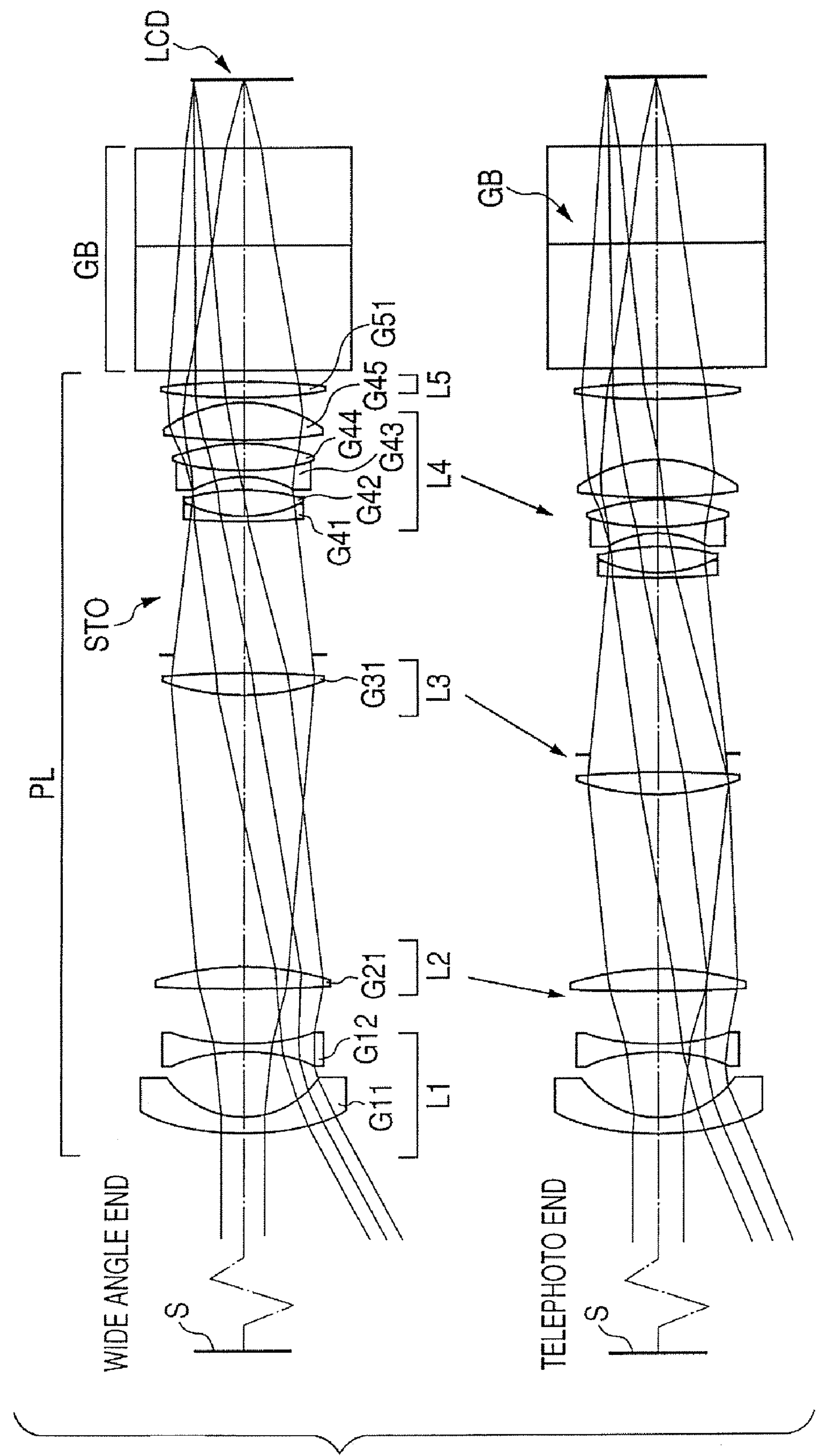
FIG. 13 schematically illustrates the relevant portions of an image projection apparatus having a zoom lens according to a fifth embodiment.

FIG. 13 illustrates the relevant portions of an image projection apparatus using a zoom lens according to a fifth embodiment at the wide angle end and at the telephoto end, respectively.

Figure 14:
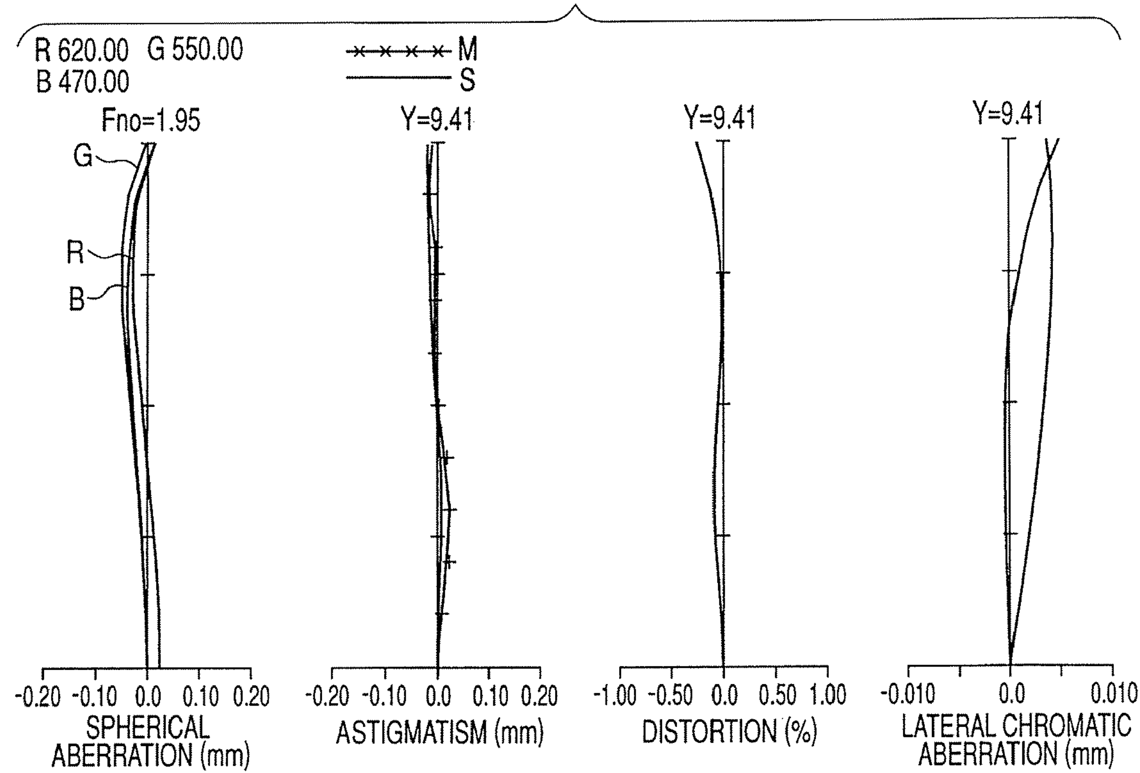
FIG. 14 shows aberrations of the zoom lens according to the fifth embodiment at the wide angle end.
Figure 15:
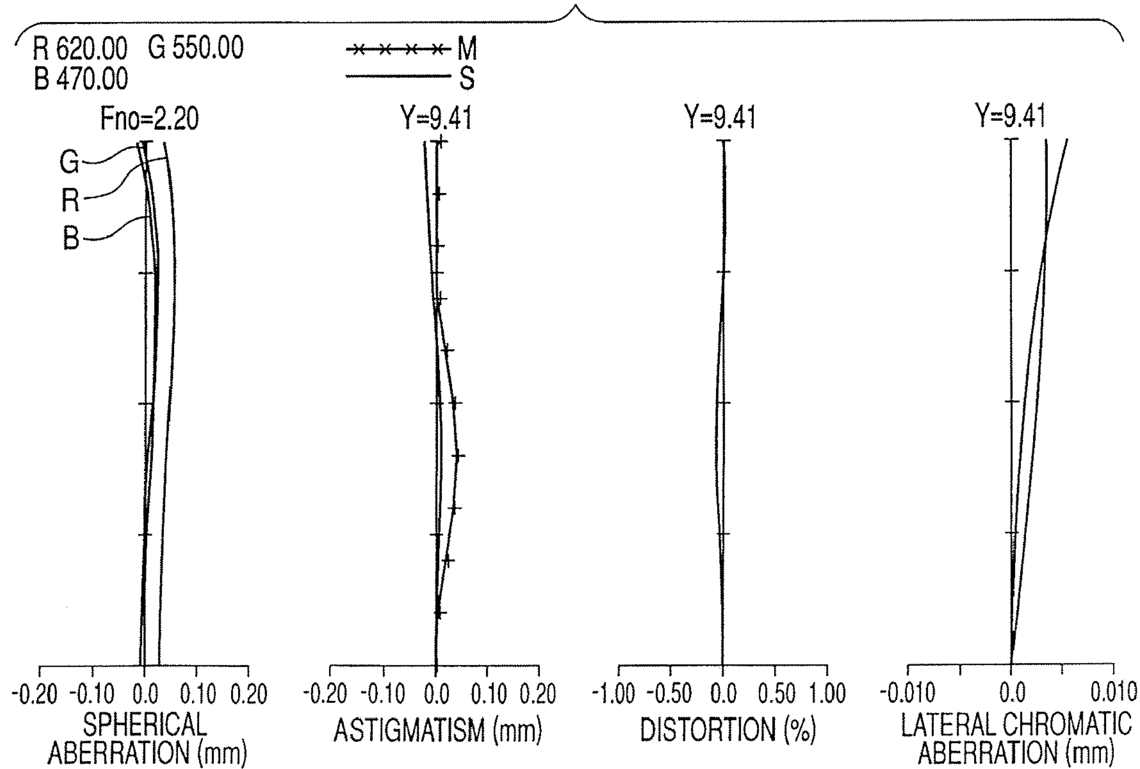
FIG. 15 shows aberrations of the zoom lens according to the fifth embodiment at the telephoto end.

FIGS. 14 and 15 show aberrations in the fifth embodiment at a screen distance of 2100 mm at the wide angle end and the telephoto end, respectively.

Figure 16:
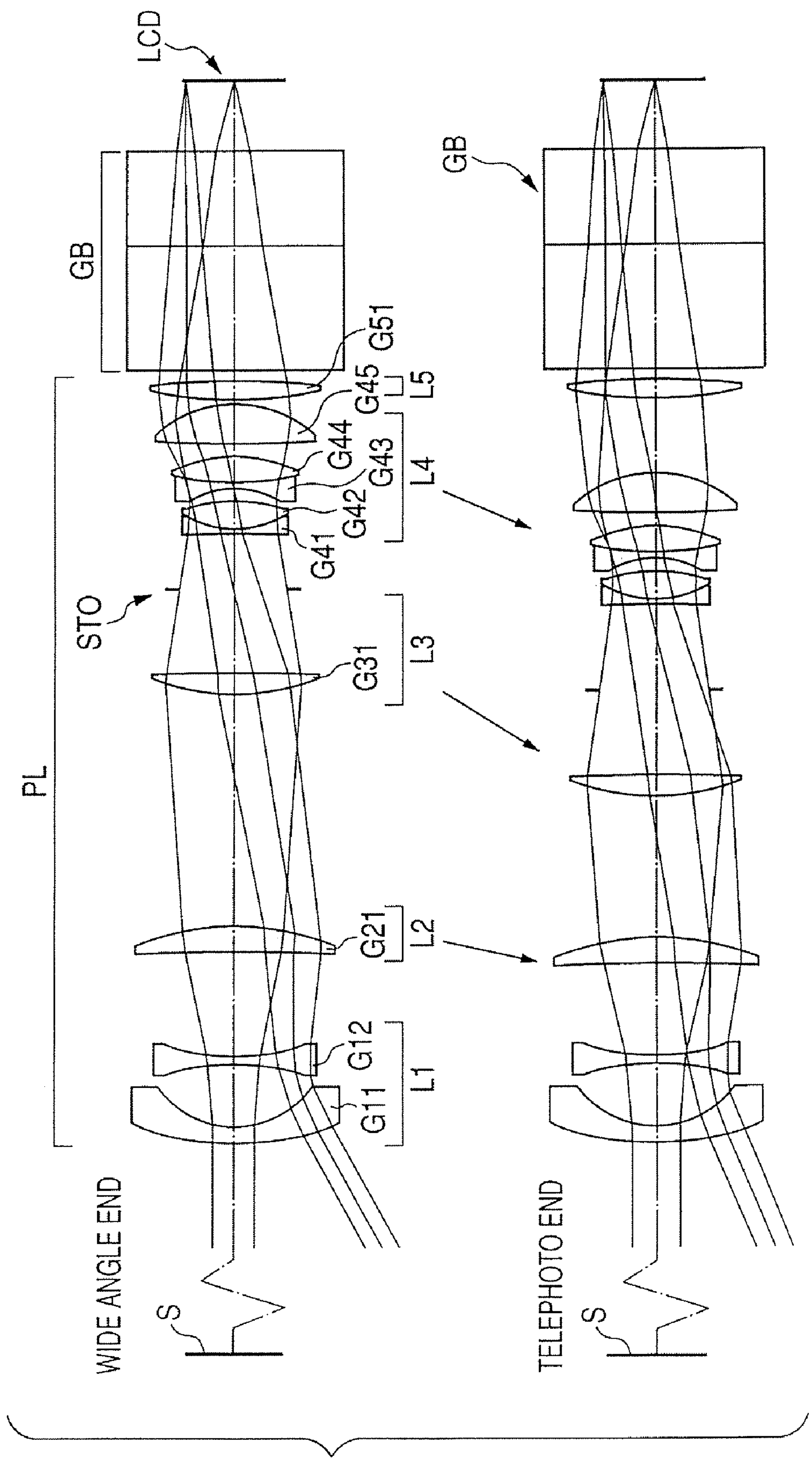
FIG. 16 schematically illustrates the relevant portions of an image projection apparatus having a zoom lens according to a sixth embodiment.

FIG. 16 illustrates the relevant portions of an image projection apparatus using a zoom lens according to a sixth embodiment at the wide angle end and at the telephoto end, respectively.

Figure 17:
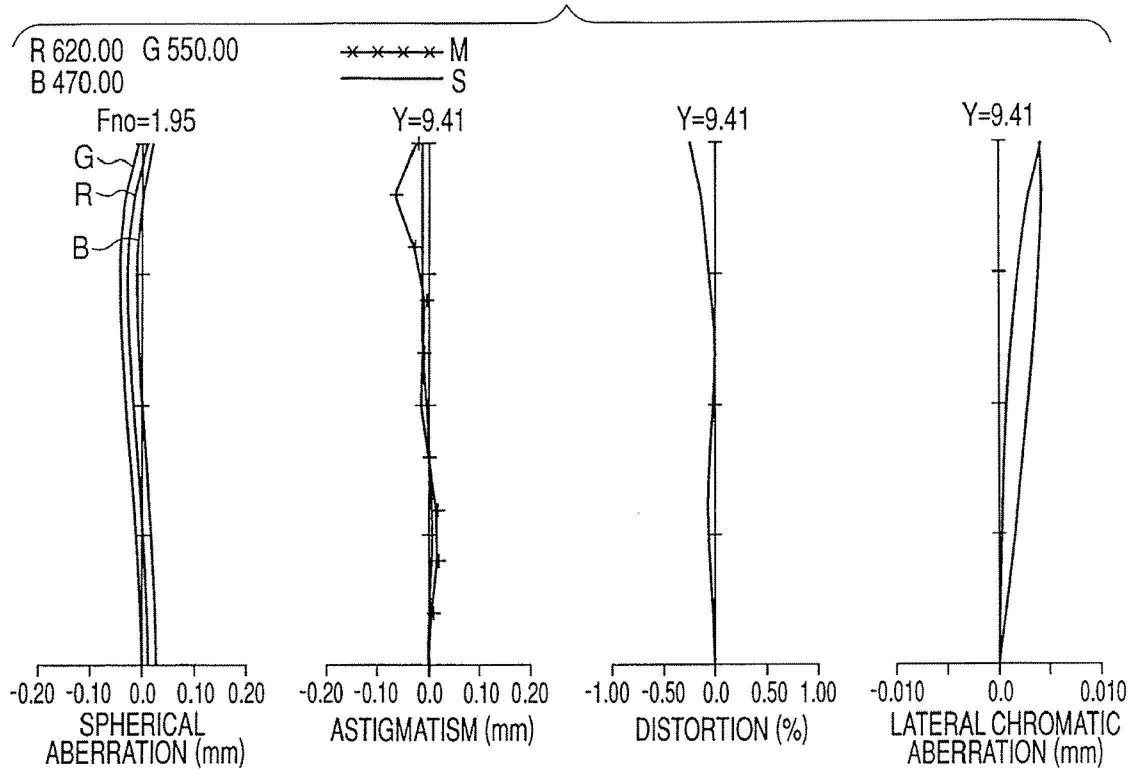
FIG. 17 shows aberrations of the zoom lens according to the sixth embodiment at the wide angle end.
Figure 18:
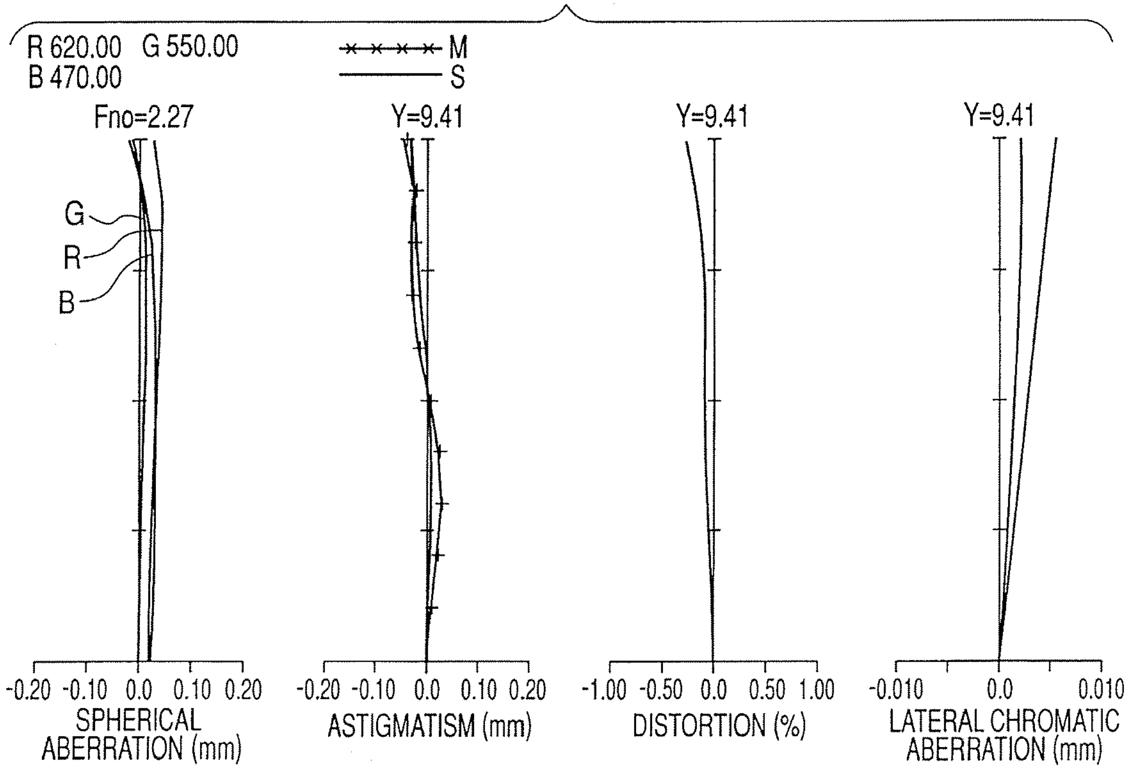
FIG. 18 shows aberrations of the zoom lens according to the sixth embodiment at the telephoto end.

FIGS. 17 and 18 show aberrations in the sixth embodiment at a screen distance of 2100 mm at the wide angle end and the telephoto end, respectively.

Figure 19:
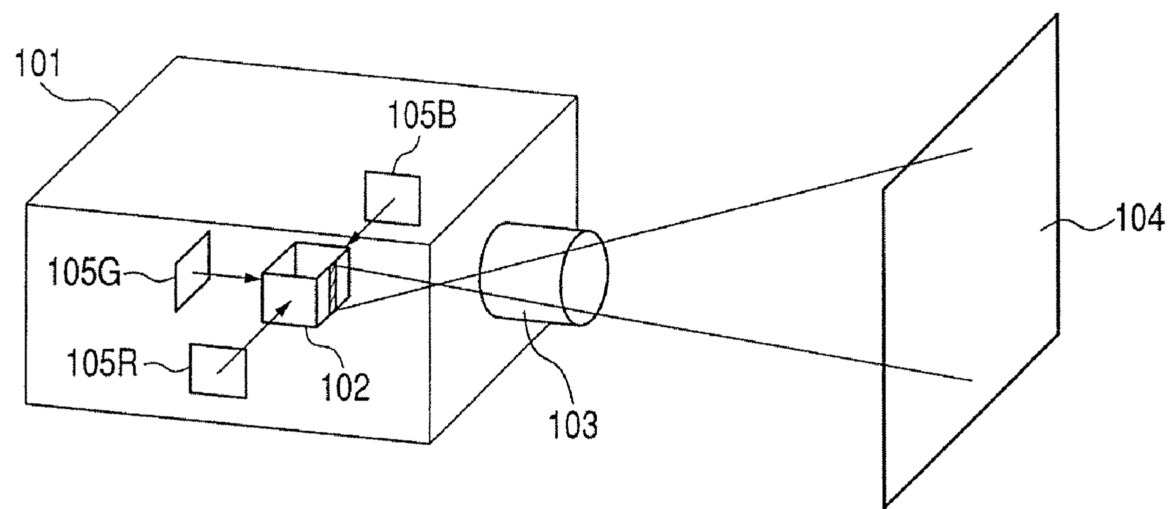
FIG. 19 schematically illustrates the relevant portions of a liquid crystal color projector.

FIG. 19 is a schematic illustration of the relevant portions of a color liquid crystal projector.

Figure 20:
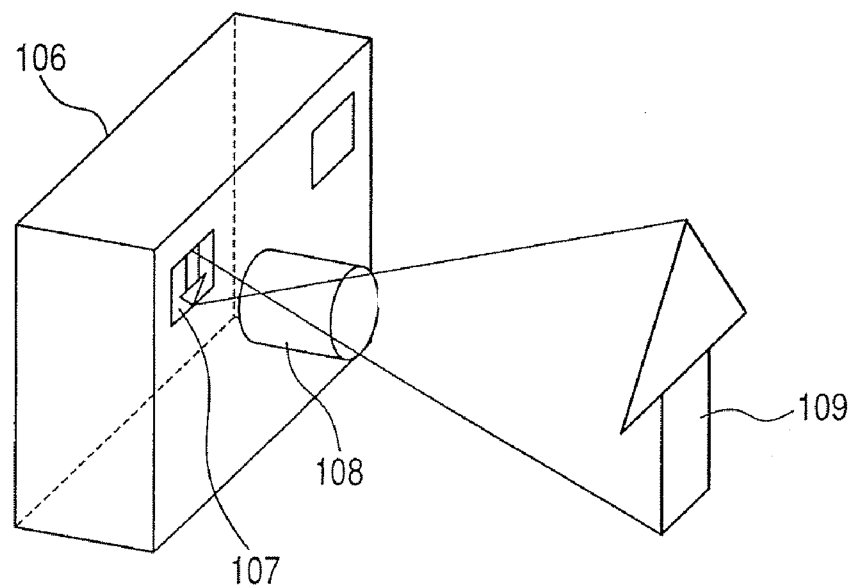
FIG. 20 schematically illustrates the relevant portions of an image pickup apparatus.

FIG. 20 is a schematic illustration of the relevant portions of an image pickup apparatus.

FIGS. 1, 4, 7, 10, 13 and 16 illustrate image projection apparatuses according to the first to sixth embodiments in the state in which an original (or an image to be projected) displayed on a liquid crystal panel LCD is projected by a zoom lens (or a projection lens) PL in an enlarging manner onto a screen surface S.

The screen surface (projection surface) S and the liquid crystal panel (liquid crystal display element) LCD are disposed on image planes of the zoom lens PL. The screen surface S and the liquid crystal panel LCD are conjugate with each other, and generally the screen surface S is at the conjugate point of the longer distance on the enlargement side (or the front side) and the liquid crystal panel LCD is at the conjugate point of the shorter distance on the reduction side (or the rear side).

When the zoom lens is used as a shooting system, the screen surface S side corresponds to the object side and the liquid crystal LCD side corresponds to the image side.

The zoom lens has an aperture stop STO.

The apparatus has a glass block GB such as a color combining prism, a polarization filter or a color filter that is provided according to the optical design.

The zoom lens PL is mounted on the body of a liquid crystal video projector (not shown) through a mount member (not shown). The glass block GB and the liquid crystal display element LCD (serving as the display unit) are housed in the body of the projector.

The lens units are numbered in the order from the enlargement side to the reduction side, and the i-th lens unit is designated by Li.

The arrows in FIGS. 1, 4, 7, 10, 13 and 16 represent movement loci of the respective lens units upon zooming from the wide angle end to the telephoto end.

The liquid crystal panel LCD is illuminated with light coming from an illumination optical system (not shown) provided on the reduction side.

To ensure satisfactory pupil alignment with the illumination optical system, the zoom lens PL is designed to have telecentricity in which the pupil on the liquid crystal panel LCD side (i.e. the reduction side) is at a distant position.

The glass block GB includes means for combining images of liquid crystal panels of respective colors R, G and B, means for selecting only a specific polarization direction and means for changing the phase of polarization.

The zoom lenses PL according to the embodiments are constructed as negative-lead type zoom lens including a plurality of lens units in which the frontmost lens (arranged on the enlargement side) is a negative lens. By this arrangement, a back focus long enough to allow disposing the glass block GB is ensured without difficulties.

In the zoom lenses PL according to the embodiments, to obtain a zooming function, some lens units are moved along the optical axis to change the combined focal length of the entire system.

Each of the zoom lenses according to the first to fourth embodiments shown in FIGS. 1, 4, 7 and 10 includes six lens units L1 to L6 in all. Upon zooming from the wide angle end to the telephoto end in the zoom lenses according to the first to fourth embodiments, the second lens unit L2, the third lens unit L3, the fourth lens unit L4 and the fifth lens unit L5 are moved independently from one another toward the screen S on the enlargement side as represented by the arrows in the corresponding drawings.

The first lens unit L1 and the sixth lens unit L6 are not moved for zooming, namely they are immobile upon zooming. Since the first lens unit L1 moves for focusing as will be described later, the first lens unit L1 moves during zooming if the zooming and the focusing are simultaneously performed.

The zoom lenses according to the fifth and sixth embodiments shown in FIGS. 13 and 16 include five lens units L1 to L5 in all. Upon zooming from the wide angle end to the telephoto end in the zoom lenses according to the fifth and sixth embodiments, the second lens unit L2, the third lens unit L3 and the fourth lens unit L4 are moved independently from one another toward the screen S as represented by the arrows in the corresponding drawings.

The first lens unit L1 and the fifth lens unit L5 are not moved for zooming.

In the zoom lens of each embodiment, focusing is effected by moving the first lens unit L1 along the optical axis.

Alternatively, focusing may be effected by moving the liquid crystal panel LCD or sixth lens unit L6.

In the zoom lenses according to the first, second, fifth and sixth embodiments shown in FIGS. 1, 4, 13 and 16, the aperture stop STO is arranged on the reduction side of the third lens unit L3.

In the zoom lenses according to the third and fourth embodiments shown in FIGS. 7 and 10, the aperture stop STO is arranged on the reduction side of the fourth lens unit L4.

The aperture stop STO is moved upon zooming.

Each lens surface has multilayer coating applied thereon for anti-reflection.

In the aberration diagrams, a curve referred by G represents an aberration at a wavelength of 550 nm, a curve referred by R represents an aberration at a wavelength of 620 nm, and a curve referred by B represents an aberration at a wavelength of 470 nm. And tilt of the sagittal image plane S and tilt of the meridional image plane M both at a wavelength of 550 nm are shown. In the aberration diagrams, the Fno is the F-number, ω is half field angle, and Y is the image height.

Each of the zoom lenses according to the embodiments is telecentric on the reduction side and is constituted by a plurality of lens units.

Each zoom lens has a negative lens (the first negative lens) G1, a negative lens (the second negative lens) G2, a positive lens (the first positive lens) G3 arranged in the mentioned order from the enlargement side to the reduction side. At least one negative lens Gn among the negative lenses G1 and G2 has an aspherical surface.

Then, the Abbe constant νd and partial dispersion ratio θgF are respectively expressed as follows, $$\nu d=(Nd-1)/(NF-NC),$$

$\theta gF=(Ng-NF)/(NF-NC)$, where Ng, Nd, NF and NC represent the refractive indices of the material for the g-line, d-line, F-line and C-line, respectively.

The zoom lens according to each embodiment satisfies at least one of the following conditions (1) to (7), $$-f12/fw<1.4 \quad (1),$$

$$-f12/(Hwpn-f12)<0.6 \quad (2),$$

$$|dn/dt|<1.0\times10^{-5} \quad (3),$$

$$\theta gF-(0.6438-0.001682\times\nu d)<0.006 \quad (4),$$

$$f3/fw<5.0 \quad (5),$$

$$fn/fw > -4.5 \quad (6),$$

$$1.3 > |L/Dpw|,$$

$$1.3 > |L/Dpt| \quad (7),$$

where fn represents the focal length of negative lens G1 or negative lens G2, f12 represents the focal length of the combined system composed of negative lens G1 and negative lens G2, Hwpn represents the distance from the rear principal point of the combined system composed of negative lens G1 and negative lens G2 to the front principal point of positive lens G3, dn/dt represents a change in the refractive index of the material of which the negative lens Gn is made relative to a change in the temperature (0° C.-40° C.) from 25° C., f3 represents the focal length of positive lens G3, νd and θgF represent the Abbe constant and the partial dispersion ratio of the material of which positive lens G3 is made, respectively, Dpw and Dpt represent the distance from the reduction side lens surface to the reduction side pupil position at the wide angle end and that at the telephoto end, respectively, L represents the entire length of the lens which is defined here as the distance from the first lens surface to the last lens surface, and fw represents the focal length of the zoom lens at the wide angle end.

Condition (1) expresses a condition to make the height hb of an off-axial principal ray in the positive lens G3 large. If the value of −f12/fw is larger than the upper limit of the condition (1), the positive lens G3 has little effect in correcting lateral chromatic aberration generated by negative lens G1 having a strong power and negative lens G2.

Condition (2) expresses a condition to make the height h of an on-axis ray in the negative lens G1 and the negative lens G2 small. If the value of −f12/(Hwpn−f12) is larger than the upper limit of the condition (2), the sensitivity of spherical aberration in the negative lens G1 and the negative lens G2 becomes high, and the degree of freedom in distortion correction becomes small.

Condition (3) expresses the ratio of change in the refractive index of the material of which the negative lens Gn having an aspherical surface is made to change in the temperature. If the value of |dn/dt| becomes larger than the upper limit of the condition (3), a change in the focus position and/or deterioration in the performance of the zoom lens will be caused by a change in the temperature.

When a material that satisfies condition (4) is used as the material of the positive lens G3, lateral chromatic aberration generated in the negative lens G1 and the negative lens G2 is effectively corrected.

If the value of θgF−(0.6438−0.001682×νd) is larger than the upper limit of the condition (4), the lateral chromatic aberration in the short wavelength components may not be corrected (there is a possibility that the lateral chromatic aberration in the short wavelength components cannot be sufficiently corrected).

Condition (5) expresses a condition to correct lateral chromatic aberration and distortion effectively in the positive lens G3 while making the entire length of the zoom lens shorter. If the value of f3/fw becomes larger than the upper limit of the condition (5), the above described effects cannot be achieved satisfactorily.

Condition (6) expresses a condition to make the field angle large more easily by using the negative lens G1 or the negative lens G2. If the value of fn/fw is lower than the lower limit, a sufficiently wide field angle cannot be achieved.

Conditions (7) are conditions to make the zoom lens according to each embodiment telecentric on the reduction side. In the embodiments, what is meant by the expression “telecentric on the image side” is that at least one of the conditions (7) is satisfied.

When at least one of the conditions (7) is satisfied, satisfactorily telecentricity on the image side is achieved.

In the zoom lenses according the embodiments, it is more preferred that the numerical limit in the conditions (1) to (7) be modified as follows, $$-f12/fw < 1.36 \quad (1a),$$

$$-f12/(Hwpn-f12) < 0.55 \quad (2a),$$

$$|dn/dt| < 0.5\times10^{-5} \quad (3a),$$

$$\theta gF-(0.6438-0.001682\times\nu d) < 0 \quad (4a),$$

$$f3/fw < 4.8 \quad (5a),$$

$$fn/fw > -4.0 \quad (6a),$$

$$1.2 > |L/Dpw|,$$

$$1.2 > |L/Dpt| \quad (7a).$$

In each of the zoom lenses according to the embodiments, a lens having a refractive power that is significantly weaker than refractive powers defined by the conditions (5) and (6) may be provided between the negative lens G1 and the negative lens G2 or between the negative lens G2 and the positive lens G3. In such cases, it is desirable, from the viewpoint of aberration correction, that the focal length fe of that additional lens satisfy the following condition, $$|fe|/fw > 6.0.$$

It is more preferred that the following conditions (1b) to (7b) be satisfied, $$0.8 < -f12/fw \quad (1b),$$

$$0.1 < -f12/(Hwpn-f12) \quad (2b),$$

$$1.0\times10^{-7} < |dn/dt| \quad (3b),$$

$$-0.03 < \theta gF-(0.6438-0.001682\times\nu d) \quad (4b),$$

$$1.0 < f3/fw \quad (5b),$$

$$fn/fw < -1.0 \quad (6b),$$

$$0.85 > |L/Dpw|,$$

$$0.85 > |L/Dpt| \quad (7b).$$

When the condition (1b) is not satisfied, the power of the negative lenses G1 and G2 is so strong that distortion and lateral chromatic aberration are generated. When the condition (2b) is not satisfied, the interval between the negative lens G2 and the positive lens G3 is so large that the size of the entire zoom lens becomes large. When the condition (5b) is not satisfied, the power of the positive lens G3 is so large that spherical aberration is generated. When the condition (6b) is not satisfied, the negative power is so large that aberrations such as distortion and lateral chromatic aberration are generated.

In the following, details of the zoom lenses according to the embodiments will be described with reference to the drawings.

In the following description, the term "paraxial marginal ray (paraxial on-axial ray)" means the light beam traveling farthest from the optical axis among the light beams from an object point on the optical axis. The height h of an on-axis ray is a distance between the on-axis ray and the optical axis.

The term "off axial principal ray (or pupil paraxial ray)" means the light beam passing through the center of gravity thereof among the light beams from an object point off the optical axis. The height hb of an off-axial principal ray is a distance between the off-axial principal ray and the optical axis.

It is assumed that light beams are emitted from the enlargement side (i.e. from the screen side, in the embodiments). It is also assumed that the screen is arranged on the left side of the optical system, and the beams entering the optical system from the screen side travel from left to right.

In the following description of the lens configuration of each lens unit, the constituent lenses will be mentioned in the order of their arrangement from the enlargement side to the reduction side, unless otherwise stated.

The zoom lens according to the first embodiment is a six-unit zoom lens including the first to six lens units L1 to L6 having negative, positive, positive, negative, positive and positive refractive powers (the refractive power being the optical power represented by the reciprocal of the focal length) respectively arranged in the mentioned order from the enlargement side to the reduction side, as shown in FIG. 1.

The first lens unit L1 includes a negative meniscus lens G11 having an aspherical surface with the convex surface facing the enlargement side and a biconcave negative lens G12.

The reduction side surface of the negative lens G11 on which the height hb of the off-axial principal ray is smaller is designed to have a negative power (refractive power) to achieve a wide field angle. The enlargement side surface of the negative lens G11 on which the height hb of the off-axial principal ray is larger is designed to have a positive refractive power, which is effective in correcting distortion, and designed to be an aspherical surface to correct distortion excellently.

The material of which the negative lens G11 is made satisfies the condition (3). Accordingly, variations in the focus position or deterioration of performance due to changes in the temperature do not occur, even though it has a strong power.

The negative lens G12 is designed to have a strong power to provide a wide field angle. The negative lens G11 and the negative lens G12 are designed to satisfy the condition (1), so that the off-axial principal ray emerging from negative lens G12 toward the reduction side upon reverse-tracing are made substantially parallel to the optical axis, whereby the height hb of the off-axial principal ray on positive lens G21 in the second lens unit L2 that will be described below is made large.

The second lens unit L2 includes only a biconvex positive lens G21 having a positive refractive power. The second lens unit L2 effectively corrects lateral chromatic aberration generated through the negative lens G11 and the negative lens G12 having a negative power in the first lens unit L1 at a position at which the height hb of the off-axial principal ray is large as described above and also corrects distortion.

In this zoom lens, the condition (2) is satisfied. Accordingly, the height h of the axial ray on the negative lens G11 and the negative lens G12 is made sufficiently small, and the sensitivity of spherical aberration is made smaller, whereby the degree of freedom in correcting distortion is made larger.

By using a material that satisfies the condition (4) as the material of the positive lens G21, its ability of correcting secondary spectrum is enhanced. Accordingly, correction of lateral chromatic aberration can be made easy.

The third lens unit L3 includes a biconvex positive lens G31 and a stop STO. Similar to the second lens unit L2, the third lens unit L3 moves along the optical axis to change the combined focal length of the entire lens system to achieve zooming.

The fourth lens unit L4 includes a cemented lens composed of a negative meniscus lens G41 with the convex surface facing the enlargement side and a biconvex positive lens G42. The fourth lens unit L4 moderates aberrations such as spherical aberration and axial chromatic aberration caused by movement of the second lens unit L2 and the third lens unit L3 that play the principal role in zooming. The fourth lens unit L4 is arranged at a position at which the height h of the axial ray is large but the height hb of the off-axial principal ray is small, whereby the fourth lens unit L4 corrects spherical aberration and axial chromatic aberration satisfactorily while suppressing the generation of lateral chromatic aberration.

The fifth lens unit L5 includes a cemented lens composed of a biconcave negative lens G51 and a biconvex positive lens G52 and a biconvex positive lens G53. The fifth lens unit L5 corrects lateral chromatic aberration and curvature of field satisfactorily throughout the zoom range.

The sixth lens unit L6 includes a biconvex positive lens G61. The sixth lens unit L6 has a function of reducing the combined refractive power of the first to fifth lens units L1 to L5. This optical function of the sixth lens unit L6 is advantageous in constructing a large-field-angle, large-diameter zoom lens.

With the above described features, the zoom lens according to the first embodiment has excellent optical characteristics at both the wide angle end and telephoto end as will be understood from FIGS. 2 and 3.

The zoom lens according to the second embodiment is a six-unit zoom lens including the first to six lens units L1 to L6 having negative, positive, positive, negative, positive and positive refractive powers respectively (the refractive power being the optical power represented by the reciprocal of the focal length) arranged in the mentioned order from the enlargement side to the reduction side, as shown in FIG. 4.

The first lens unit L1 includes a negative meniscus lens G11 with the convex surface facing the enlargement side, a biconcave negative lens G12 having an aspherical surface and a biconvex positive lens G13.

The third lens unit L3 includes a positive meniscus lens G31 with the convex surface facing the enlargement side and a stop STO. Similar to the second lens unit L2, the third lens unit L3 moves along the optical axis to change the focal length of the combined focal length of the entire lens system to achieve zooming.

In the zoom lens according to the second embodiment, the height hb of the off-axial principal ray on the second lens unit L2 is smaller than that in the zoom lens according to the first embodiment. The second lens unit L2 plays the principal role in zooming.

The functions of the lens units other than those mentioned above are the same as those in the zoom lens according to the first embodiment.

With the above described features, the zoom lens according to the second embodiment has excellent optical characteristics at both the wide angle end and telephoto end as will be understood from FIGS. 5 and 6.

The zoom lens according to the third embodiment is a six-unit zoom lens including the first to six lens units L1 to L6 having negative, positive, positive, positive, negative and positive refractive powers respectively arranged in the mentioned order from the enlargement side to the reduction side, as shown in FIG. 7.

In the zoom lens according to the third embodiment, the first lens unit L1 in the second embodiment is divided into the first lens unit L1 including two negative lenses and the second lens unit L2 including a single positive lens so as to reduce aberration variations upon zooming.

The third lens unit L3 and the fourth lens unit L4 in the zoom lens according to the third embodiment correspond to the second lens unit L2 and the third lens unit L3 in the zoom lens according to the second embodiment.

The fifth lens unit L5 in the zoom lens according to the third embodiment corresponds to the fourth lens unit L4 and the fifth lens unit L5 in the zoom lens according to the second embodiment but is constructed as one lens unit. In the third embodiment, the fifth lens unit L5 having a weak negative power is additionally provided. The fifth lens unit L5 has both a function as a compensator lens unit and a function of making variations in off-axial aberration upon zooming small.

The configurations of the lens units other than those mentioned above are the same as those in the zoom lens according to the second embodiment.

With the above described features, the zoom lens according to the third embodiment has excellent optical characteristics at both the wide angle end and telephoto end as will be understood from FIGS. 8 and 9.

The zoom lens according to the fourth embodiment is a six-unit zoom lens including the first to six lens units L1 to L6 having negative, positive, positive, positive, positive and positive refractive powers respectively arranged in the mentioned order from the enlargement side to the reduction side, as shown in FIG. 10.

In the zoom lens according to the fourth embodiment, the first lens unit L1 in the zoom lens according to the second embodiment is divided into the first lens unit L1 including two negative lenses and the second lens unit L2 including a single positive lens, as is the case with the first embodiment, so that aberration variations upon zooming are reduced.

The third lens unit L3 and the fourth lens unit L4 in the zoom lens according to the fourth embodiment correspond to the second lens unit L2 and the third lens unit L3 in the zoom lens according to the second embodiment.

The fifth lens unit L5 in the zoom lens according to the fourth embodiment corresponds to the fourth lens unit L4 and the fifth lens unit L5 in the zoom lens according to the second embodiment but is constructed as one lens unit. In the fourth embodiment, the fifth lens unit L5 having a weak positive power is additionally provided. The fifth lens unit L5 has both a function as a compensator lens unit and a function of making variations in off-axial aberration upon zooming small.

The configurations of the lens units other than those mentioned above are the same as those in the zoom lens according to the second embodiment.

With the above described features, the zoom lens according to the fourth embodiment has excellent optical characteristics at both the wide angle end and telephoto end as will be understood from FIGS. 11 and 12.

The zoom lens according to the fifth embodiment is a five-unit zoom lens including the first to fifth lens units L1 to L5 having negative, positive, positive, positive and positive refractive powers respectively arranged in the mentioned order from the enlargement side to the reduction side, as shown in FIG. 13.

The fourth lens unit L4 in the zoom lens according to the fifth embodiment corresponds to the fourth lens unit L4 and the fifth lens unit L5 in the zoom lens according to the first embodiment but is constructed as one lens unit. In the fifth embodiment, the fourth lens unit L4 having a weak positive power is additionally provided. The fourth lens unit L4 has both a function as a compensator lens unit and a function of making variations in off-axial aberration upon zooming small.

The first, second, third and fifth lens units L1, L2, L3, and L5 in the fifth embodiment correspond to the first, second, third and sixth lens units L1, L2, L3, L6 in the first embodiment respectively, and the configurations and technical advantages of these lens units in the fifth embodiment are the same as those in the first embodiment.

With the above described features, the zoom lens according to the fifth embodiment has excellent optical characteristics at both the wide angle end and telephoto end as will be understood from FIGS. 14 and 15.

The zoom lens according to the sixth embodiment is a five-unit zoom lens including the first to fifth lens units L1 to L5 having negative, positive, positive, negative and positive refractive powers respectively arranged in the mentioned order from the enlargement side to the reduction side, as shown in FIG. 16.

The fourth lens unit L4 in the zoom lens according to the sixth embodiment corresponds to the fourth lens unit L4 and the fifth lens unit L5 in the zoom lens according to the first embodiment but is constituted as one lens unit. In the sixth embodiment, the fourth lens unit L4 having a weak negative power is additionally provided. The fourth lens unit L4 has both a function as a compensator lens unit and a function of making variations in off-axial aberration upon zooming small.

The first, second, third and fifth lens units L1, L2, L3, and L5 in the sixth embodiment correspond to the first, second, third and sixth lens units L1, L2, L3, L6 in the first embodiment respectively, and the configurations and technical advantages of these lens units in the sixth embodiment are the same as those in the first embodiment.

With the above described features, the zoom lens according to the sixth embodiment has excellent optical characteristics at both the wide angle end and telephoto end as will be understood from FIGS. 17 and 18.

FIG. 19 schematically illustrates the relevant portions of an image projection apparatus according to an embodiment of the present invention.

In the apparatus illustrated in FIG. 19, a zoom lens like those described above is applied to a tri-panel type liquid crystal color projector, in which image information of multiple colors of light generated by multiple liquid crystal panels are combined through color combining means 102. The image projection apparatus projects an enlarged image onto a screen surface (projection surface) 104 through the zoom lens 103.

The liquid crystal color projector 101 shown in FIG. 19 combines multiple colors of light R, G, B from three liquid crystal panels 105R, 105G and 105B for respective colors of R, G and B into one optical path by means of a prism 102 serving as color combining means and projects the combined light onto the screen 104 by means of the projection lens 103 in the form of a zoom lens like those described above.

FIG. 20 schematically illustrates the relevant portions of an image pickup apparatus according to an embodiment of the present invention. In the embodiment shown in FIG. 20, a zoom lens like those described above is used as a shooting lens in an image pickup apparatus 106 such as a video camera, a film camera or a digital camera.

The apparatus illustrated in FIG. 20 forms an image of an object 109 on a photosensitive member 107 through a shooting lens 108, so that the photosensitive member receives light from the object, and obtains image information. The photosensitive member may be a silver-halide film or a solid state image pickup element (photoelectric transducer) such as a CCD sensor or a CMOS sensor.

According to the above described embodiments, there can be provided a zoom lens that can be suitably used in a liquid crystal projector and shows excellent optical performance throughout the image frame with satisfactorily corrected aberrations upon zooming, while the size of the entire lens system can be made small.

In addition, there can be provided a zoom lens that can be suitably used in an image pickup apparatus, such as a video camera, a film camera or a digital camera, in which image information (an image of an object) is formed on a silver-halide film or a solid state image pickup element (photoelectric transducer) such as a CCD sensor or a CMOS sensor.

In the following, numerical embodiments 1 to 6 corresponding to the zoom lenses according to the first to six embodiments will be presented. In each numerical embodiment, number i refers to the optical surface number counted from the enlargement side (or the front side). Thus, ri is the radius of curvature of the i-th optical surface (the i-th surface), di is the interval between the i-th surface and the (i+1)-th surface. The radius of curvature ri and the interval di will be presented in unit of millimeters. ni represents the refractive index for the d-line of the i-th optical member and vi represents the Abbe constant of the i-th optical member, fw represents the focal length at the wide angle end, ft represents the focal length at the telephoto end, and Fno represents the f-number.

The aspherical shape is expressed by the following equation in terms of the height h from the optical axis and the displacement (or distance) in the direction parallel to the optical axis at that height h from the surface vertex as the reference point:

$$X = (h^2/r)\Big/\left[1 + \{1 - (1+k)(h/r)^2\}^{1/2}\right] + Ah^4 + Bh^6 + Ch^8 + Dh^{10} + Eh^{12},$$

where k is the conic constant, A, B, C, D and E are aspherical coefficients, and r is the paraxial radius of curvature.

In the following, the expression "e−Z" stands for "$10^{-Z}$".

The lens configurations and values associated with the aforementioned conditions (1) to (7) in the numerical embodiments 1 to 6 will be presented in Table 1.

In Table 1, the value associated with condition (6) will be presented for both the focal lengths of negative lens G1 and negative G2 represented as f1 and f2, respectively.

Numerical Embodiment 1

| | fw: 15.05 | ft: 22.28 | Fno: 1.95–2.54 | |
|---|---|---|---|---|
| | curvature radius: r | surface interval: d | refractive index: Nd | Abbe number: vd |
| screen | | 1890.00 | | |
| 1 (*) | 80.64 | 3.00 | 1.58313 | 59.4 |
| 2 (*) | 19.13 | 11.32 | | |
| 3 | −58.24 | 1.50 | 1.48749 | 70.2 |
| 4 | 39.97 | (variable) | | |
| 5 | 161.59 | 4.24 | 1.83400 | 37.2 |
| 6 | −89.08 | (variable) | | |
| 7 | 39.24 | 3.41 | 1.57099 | 50.8 |
| 8 | −1224.13 | 3.65 | | |
| 9 (STO) | | (variable) | | |
| 10 | 222.14 | 1.00 | 1.83400 | 37.2 |
| 11 | 18.81 | 5.64 | 1.48749 | 70.2 |
| 12 | −35.48 | (variable) | | |
| 13 | −18.89 | 1.20 | 1.83400 | 37.2 |
| 14 | 56.11 | 5.11 | 1.48749 | 70.2 |
| 15 | −27.83 | 0.15 | | |
| 16 | 104.58 | 6.79 | 1.48749 | 70.2 |
| 17 | −24.37 | (variable) | | |
| 18 | 366.06 | 2.69 | 1.78472 | 25.7 |
| 19 | −75.93 | 2.00 | | |
| prism | | 23.61 | 1.51633 | 64.1 |
| prism | | 18.00 | 1.80518 | 25.4 |

(*) aspherical surface

Surface Interval

| surface number | wide angle end | telephoto end |
|---|---|---|
| 4 | 28.08 | 19.03 |
| 6 | 49.55 | 28.47 |
| 9 | 12.13 | 23.55 |
| 12 | 2.73 | 5.85 |
| 17 | 3.06 | 18.64 |

Aspherical Coefficient

| surface number | K | A | B | C | D | E |
|---|---|---|---|---|---|---|
| 1 | 0.000E+00 | 2.403E−05 | −1.119E−07 | 3.418E−10 | −5.654E−13 | 3.833E−16 |
| 2 | 0.000E+00 | 1.995E−05 | −1.267E−07 | 1.463E−10 | 5.385E−13 | −2.316E−15 |

Numerical Embodiment 2

| | fw: 16.68 ft: 24.70 Fno: 2.2–2.73 | | | |
|---|---|---|---|---|
| | curvature radius: r | surface interval: d | refractive index: Nd | Abbe number: νd |
| screen | | 2100.00 | | |
| 1 | 29.87 | 1.60 | 1.74400 | 44.8 |
| 2 | 16.00 | 9.23 | | |
| 3 (*) | −67.74 | 2.50 | 1.58313 | 59.4 |
| 4 (*) | 26.29 | 16.70 | | |
| 5 | 338.39 | 4.93 | 1.62588 | 35.7 |
| 6 | −51.79 | (variable) | | |
| 7 | 57.72 | 3.88 | 1.48749 | 70.2 |
| 8 | −221.38 | (variable) | | |
| 9 | 29.44 | 2.56 | 1.60342 | 38.0 |
| 10 | 58.34 | 2.72 | | |
| 11 (STO) | | (variable) | | |
| 12 | 405.52 | 1.00 | 1.83400 | 37.2 |
| 13 | 16.59 | 5.56 | 1.48749 | 70.2 |
| 14 | −28.18 | (variable) | | |
| 15 | −18.22 | 1.10 | 1.83400 | 37.2 |
| 16 | 40.47 | 4.47 | 1.48749 | 70.2 |
| 17 | −36.32 | 0.15 | | |
| 18 | 86.52 | 7.62 | 1.48749 | 70.2 |
| 19 | −21.60 | (variable) | | |
| 20 | 141.41 | 2.59 | 1.80518 | 25.4 |
| 21 | −117.70 | 2.20 | | |
| prism | | 27.24 | 1.51633 | 64.1 |
| prism | | 18.00 | 1.80518 | 25.4 |

(*) aspherical surface

Surface Interval

| surface number | wide angle end | telephoto end |
|---|---|---|
| 6 | 41.37 | 12.69 |
| 8 | 21.63 | 22.91 |
| 11 | 13.38 | 18.18 |
| 14 | 2.27 | 3.34 |
| 19 | 0.74 | 22.28 |

Aspherical Coefficient

| surface number | K | A | B | C | D | E |
|---|---|---|---|---|---|---|
| 3 | −8.653E−01 | 5.386E−06 | −1.110E−07 | 1.003E−09 | −5.566E−12 | 1.157E−14 |
| 4 | −4.329E+00 | 5.179E−06 | −1.528E−03 | 9.511E−10 | −4.889E−12 | 9.829E−15 |

Numerical Embodiment 3

| | fw: 16.69 ft: 24.72 Fno: 2.2–2.67 | | | |
|---|---|---|---|---|
| | curvature radius: r | surface interval: d | refractive index: Nd | Abbe number: νd |
| screen | | 2100.00 | | |
| 1 | 31.63 | 1.60 | 1.74400 | 44.8 |
| 2 | 17.33 | 10.03 | | |
| 3 (*) | −50.59 | 2.50 | 1.58313 | 59.4 |
| 4 (*) | 25.79 | 11.13 | | |
| 5 | 705.99 | 5.74 | 1.62588 | 35.7 |
| 6 | −40.55 | (variable) | | |
| 7 | 47.45 | 3.84 | 1.53172 | 48.8 |
| 8 | −1151.27 | (variable) | | |
| 9 | 29.49 | 2.71 | 1.51823 | 58.9 |
| 10 | 72.63 | 2.25 | | |
| 11 (STO) | | (variable) | | |
| 12 | −332.96 | 1.00 | 1.83400 | 37.2 |
| 13 | 17.25 | 5.40 | 1.48749 | 70.2 |
| 14 | −27.08 | (variable) | | |
| 15 | −17.91 | 1.10 | 1.83400 | 37.2 |
| 16 | 42.30 | 4.88 | 1.48749 | 70.2 |
| 17 | −32.19 | 0.60 | | |
| 18 | 103.58 | 7.59 | 1.48749 | 70.2 |
| 19 | −22.02 | (variable) | | |
| 20 | 91.73 | 2.72 | 1.80518 | 25.4 |
| 21 | −178.03 | 2.00 | | |
| prism | | 27.24 | 1.51633 | 64.1 |
| prism | | 18.00 | 1.80518 | 25.4 |

(*) aspherical surface

Surface Interval

| surface number | wide angle end | telephoto end |
|---|---|---|
| 6 | 47.93 | 11.99 |
| 8 | 19.27 | 18.46 |
| 11 | 12.69 | 21.57 |
| 14 | 2.43 | 17.18 |
| 19 | 0.60 | 22.42 |

Aspherical Coefficient

| surface number | K | A | B | C | D | E |
|---|---|---|---|---|---|---|
| 3 | −8.653E−01 | 1.966E−06 | −1.133E−07 | 1.078E−09 | −5.355E−12 | 9.792E−15 |
| 4 | −4.329E+00 | 3.949E−06 | −1.434E−07 | 1.056E−09 | −4.834E−12 | 8.662E−15 |

Numerical Embodiment 4

| | fw: 16.69 ft: 24.72 Fno: 2.2–2.89 | | | |
|---|---|---|---|---|
| | curvature radius: r | surface interval: d | refractive index: Nd | Abbe number: νd |
| screen | | 2100.00 | | |
| 1 | 30.29 | 1.60 | 1.74400 | 44.8 |
| 2 | 17.02 | 9.91 | | |
| 3 (*) | −72.76 | 2.50 | 1.58313 | 59.4 |
| 4 (*) | 24.34 | 17.10 | | |
| 5 | −51925.77 | 5.32 | 1.62588 | 35.7 |
| 6 | −47.06 | (variable) | | |
| 7 | 46.69 | 3.55 | 1.66998 | 39.3 |
| 8 | 213.80 | (variable) | | |
| 9 | 32.05 | 2.45 | 1.48749 | 70.2 |
| 10 | 82.78 | 7.00 | | |
| 11 (STO) | | (variable) | | |
| 12 | 4790.18 | 1.00 | 1.83400 | 37.2 |
| 13 | 18.45 | 5.06 | 1.48749 | 70.2 |
| 14 | −33.27 | (variable) | | |
| 15 | −17.98 | 1.10 | 1.83400 | 37.2 |
| 16 | 45.10 | 5.19 | 1.48749 | 70.2 |
| 17 | −26.39 | 0.44 | | |
| 18 | 103.08 | 7.55 | 1.48749 | 70.2 |
| 19 | −22.83 | (variable) | | |
| 20 | 175.98 | 2.75 | 1.80518 | 25.4 |
| 21 | −98.28 | 2.00 | | |
| prism | | 27.24 | 1.51633 | 64.1 |
| prism | | 18.00 | 1.80518 | 25.4 |

(*) aspherical surface

Surface Interval

| surface number | wide angle end | telephoto end |
|---|---|---|
| 6 | 31.58 | 16.00 |
| 8 | 29.25 | 6.86 |
| 11 | 3.99 | 23.51 |
| 14 | 2.71 | 14.66 |
| 19 | 5.96 | 26.85 |

Aspherical Coefficient

| surface number | K | A | B | C | D | E |
|---|---|---|---|---|---|---|
| 3 | −8.653E−01 | 3.325E−06 | −1.072E−07 | 9.280E−10 | −4.416E−12 | 7.875E−15 |
| 4 | −4.329E+00 | 1.074E−05 | −1.779E−07 | 1.110E−09 | −4.812E−12 | 8.364E−15 |

Numerical Embodiment 5

| | fw: 16.71 ft: 21.38 Fno: 1.95–2.20 | | | |
|---|---|---|---|---|
| | curvature radius: r | surface interval: d | refractive index: Nd | Abbe number: vd |
| screen | | 2100.00 | | |
| 1 (*) | 63.47 | 3.00 | 1.58313 | 59.4 |
| 2 (*) | 17.88 | 12.21 | | |
| 3 | −30.63 | 1.50 | 1.48749 | 70.2 |
| 4 | 48.78 | (variable) | | |
| 5 | 565.48 | 4.14 | 1.83400 | 37.2 |
| 6 | −51.35 | (variable) | | |
| 7 | 41.38 | 4.26 | 1.57099 | 50.8 |
| 8 | −161.76 | 3.38 | | |
| 9 (STO) | | (variable) | | |
| 10 | 96.94 | 1.00 | 1.83400 | 37.2 |
| 11 | 26.38 | 4.71 | 1.48749 | 70.2 |
| 12 | −45.21 | 2.59 | | |
| 13 | −21.29 | 1.20 | 1.83400 | 37.2 |
| 14 | 40.62 | 5.08 | 1.48749 | 70.2 |
| 15 | −37.85 | 0.15 | | |
| 16 | 84.36 | 7.55 | 1.48749 | 70.2 |
| 17 | −26.08 | (variable) | | |
| 18 | 80.43 | 2.98 | 1.76821 | 26.5 |
| 19 | −200.24 | 2.00 | | |
| prism | | 23.61 | 1.51633 | 64.1 |
| prism | | 18.00 | 1.80518 | 25.4 |

(*) aspherical surface

Surface Interval

| surface number | wide angle end | telephoto end |
|---|---|---|
| 4 | 10.20 | 9.78 |
| 6 | 50.54 | 32.47 |
| 9 | 24.91 | 32.89 |
| 17 | 0.60 | 11.11 |

Aspherical Coefficient

| surface number | K | A | B | C | D | E |
|---|---|---|---|---|---|---|
| 1 | 0.000E+00 | 2.315E−05 | −1.064E−07 | 3.667E−10 | −6.697E−13 | 5.326E−16 |
| 2 | 0.000E+00 | 1.715E−05 | −1.571E−07 | 4.097E−10 | −5.152E−13 | −1.012E−15 |

Numerical Embodiment 6

| | fw: 16.72 ft: 21.42 Fno: 1.95–2.27 | | | |
|---|---|---|---|---|
| | curvature radius: r | surface interval: d | refractive index: Nd | Abbe number: vd |
| screen | | 2100.00 | | |
| 1 (*) | 75.11 | 3.00 | 1.58313 | 59.4 |
| 2 (*) | 20.35 | 11.79 | | |
| 3 | −45.67 | 1.50 | 1.48749 | 70.2 |
| 4 | 50.11 | (variable) | | |
| 5 | −242.74 | 4.72 | 1.80610 | 40.9 |
| 6 | −50.01 | (variable) | | |
| 7 | 40.66 | 4.34 | 1.60738 | 56.8 |
| 8 | −311.47 | 15.76 | | |
| 9 (STO) | | (variable) | | |
| 10 | −196.78 | 1.00 | 1.83400 | 37.2 |
| 11 | 21.89 | 4.94 | 1.48749 | 70.2 |
| 12 | −27.53 | 2.64 | | |
| 13 | −16.65 | 1.20 | 1.83400 | 37.2 |
| 14 | 49.19 | 5.20 | 1.48749 | 70.2 |
| 15 | −25.49 | 2.19 | | |
| 16 | 266.17 | 7.69 | 1.48749 | 70.2 |
| 17 | −22.85 | (variable) | | |
| 18 | 66.65 | 3.49 | 1.74950 | 35.3 |
| 19 | −162.33 | 2.00 | | |
| prism | | 23.61 | 1.51633 | 64.1 |
| prism | | 18.00 | 1.80518 | 25.4 |

(*) aspherical surface

Surface Interval

| surface number | wide angle end | telephoto end |
|---|---|---|
| 4 | 19.72 | 17.22 |
| 6 | 44.21 | 27.03 |
| 9 | 10.61 | 16.59 |
| 17 | 0.60 | 14.29 |

Aspherical Coefficient

| surface number | K | A | B | C | D | E |
|---|---|---|---|---|---|---|
| 1 | 0.000E+00 | 2.117E−05 | −1.127E−07 | 3.619E−10 | −6.120E−13 | 4.159E−16 |
| 2 | 0.000E+00 | 1.982E−05 | −1.527E−07 | 3.935E−10 | −3.409E−13 | −7.900E−16 |

TABLE 1

(Values Associated with Conditions in Embodiments)

| embodiments | lens configuration | (1) −f12/fw | (2) −f12/ (Hwpn − f12) | (3) dn/dt | (4) anomalous despersion | (5) f3/fw | (6) f1/fw | (6) f2/fw | (7) L/Dpw | (7) L/Dpt |
|---|---|---|---|---|---|---|---|---|---|---|
| 1 | NPPNPP | 1.355 | 0.359 | $0.35 \times 10^{-5}$ | 0.0055 | 4.584 | −2.899 | −3.205 | −0.680 | 0.492 |
| 2 | NPPNPP | 1.037 | 0.428 | $0.35 \times 10^{-5}$ | −0.0037 | 4.297 | −2.904 | −1.921 | −0.819 | 0.102 |
| 3 | NPPPNP | 1.005 | 0.481 | $0.35 \times 10^{-5}$ | −0.0037 | 3.659 | −3.226 | −1.728 | −0.667 | 0.224 |
| 4 | NPPPPP | 1.061 | 0.425 | $0.35 \times 10^{-5}$ | −0.0037 | 4.480 | −3.281 | −1.849 | −1.159 | 0.246 |
| 5 | NPPPP | 1.066 | 0.501 | $0.35 \times 10^{-5}$ | 0.0055 | 3.370 | −2.610 | −2.289 | 0.014 | 0.614 |
| 6 | NPPNP | 1.300 | 0.432 | $0.35 \times 10^{-5}$ | | 4.597 | −2.912 | −2.907 | −0.220 | 0.678 |

*anomalous dispersion = θgF − (0.6438 − 0.001682 × νd)

According to the above described embodiments, there can be provided a zoom lens or a projector having excellent optical performance throughout the image frame in which variations in optical characteristics caused by environmental changes and aberration variations upon zooming are small. The zoom lens may suitably be used in, for example, a liquid crystal projector.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-159658, filed on Jun. 8, 2006 which is hereby incorporated by reference herein in its entirety.

What is claimed is:

1. A zoom lens telecentric on a reduction side, comprising, in the mentioned order from enlargement side to reduction side:

a first negative lens;

a second negative lens; and a first positive lens, wherein at least one negative lens among the first negative lens and the second negative lens has an aspherical surface, and the zoom lens satisfies the following conditions:

$$-f12/fw<1.4,$$

$$-f12/(Hwpn-f12)<0.6, \text{ and}$$

$$|dn/dt|<1.0\times10^{-5},$$

where f12 is the focal length of the combined optical system composed of the first negative lens and the second negative lens, Hwpn is the distance from the rear principal point of the combined optical system composed of the first negative lens and the second negative lens to the front principal point of the first positive lens, dn/dt is a change in the refractive index of the material of said one negative lens relative to a change in its temperature from 25° C., and fw is the focal length of the entire lens system at the wide angle end.

2. A zoom lens according to claim 1, satisfying the following condition:

$$\theta gF-(0.6438-0.001682\times\nu d)<0.006$$

where νd and θgF are the Abbe constant and the partial dispersion ratio of the material of the first positive lens, respectively.

3. A zoom lens according to claim 1, satisfying the following condition:

$$f3/fw<5.0$$

where f3 is the focal length of the first positive lens.

4. A zoom lens according to claim 1, satisfying the following condition:

$$fn/fw>-4.5$$

where fn is the focal length of the first negative lens or the second negative lens.

5. A zoom lens according to claim 1, satisfying the following conditions:

$$1.3>|L/Dpw|, \text{ and}$$

$$1.3>|L/Dpt|$$

where Dpw and Dpt are the distances from a reduction side lens surface to a reduction side pupil position at the wide angle end and at the telephoto end respectively, and L is the entire length of the zoom lens.

6. A zoom lens according to claim 1, wherein said first negative lens is arranged at a frontmost position in the enlargement side in the zoom lens, the second negative lens is arranged adjacent to the first negative lens, and the first positive lens is arranged adjacent to the second negative lens.

7. A zoom lens according to claim 1, wherein the zoom lens comprises, in the mentioned order from the enlargement side to the reduction side, a first lens unit having a negative refractive power, a second lens unit having a positive refractive power, a third lens unit having a positive refractive power, a fourth lens unit having a negative refractive power, a fifth lens unit having a positive refractive power and a sixth lens unit having a positive refractive power, the first and sixth lens units do not move for zooming, the second, third, fourth and fifth lens units move to the enlargement side upon zooming from the wide angle end to the telephoto end, the first negative lens and the second negative lens are included in the first lens unit, and the first positive lens is included in the second lens unit.

8. A zoom lens according to claim 1, wherein the zoom lens comprises, in the mentioned order from the enlargement side to the reduction side, a first lens unit having a negative refractive power, a second lens unit having a positive refractive power, a third lens unit having a positive refractive power, a fourth lens unit having a negative refractive power, a fifth lens unit having a positive refractive power and a sixth lens unit having a positive refractive power, the first and sixth lens units do not move for zooming, the second, third, fourth and fifth lens units move to the enlargement side upon zooming from the wide angle end to the telephoto end, the first negative lens, the second negative lens and the first positive lens are included in the first lens unit.

9. A zoom lens according to claim 1, wherein the zoom lens comprises, in the mentioned order from the enlargement side to the reduction side, a first lens unit having a negative refractive power, a second lens unit having a positive refractive power, a third lens unit having a positive refractive power, a fourth lens unit having a positive refractive power, a fifth lens unit having a negative refractive power and a sixth lens unit having a positive refractive power, the first and sixth lens units do not move for zooming, the second, third, fourth and fifth lens units move to the enlargement side upon zooming from the wide angle end to the telephoto end, the first negative lens and the second negative lens are included in the first lens unit, and the first positive lens is included in the second lens unit.

10. A zoom lens according to claim 1, wherein the zoom lens comprises, in the mentioned order from the enlargement side to the reduction side, a first lens unit having a negative refractive power, a second lens unit having a positive refractive power, a third lens unit having a positive refractive power, a fourth lens unit having a positive refractive power, a fifth lens unit having a positive refractive power and a sixth lens unit having a positive refractive power, the first and sixth lens units do not move for zooming, the second, third, fourth and fifth lens units move to the enlargement side upon zooming from the wide angle end to the telephoto end, the first negative lens and the second negative lens are included in the first lens unit, and the first positive lens is included in the second lens unit.

11. A zoom lens according to claim 1, wherein the zoom lens comprises, in the mentioned order from the enlargement side to the reduction side, a first lens unit having a negative refractive power, a second lens unit having a positive refractive power, a third lens unit having a positive refractive power, a fourth lens unit having a positive refractive power and a fifth lens unit having a positive refractive power, the first and fifth lens units do not move for zooming, the second, third and fourth lens units move to the enlargement side upon zooming from the wide angle end to the telephoto end, the first negative lens and the second negative lens are included in the first lens unit, and the first positive lens is included in the second lens unit.

12. A zoom lens according to claim 1, wherein the zoom lens comprises, in the mentioned order from the enlargement side to the reduction side, a first lens unit having a negative refractive power, a second lens unit having a positive refractive power, a third lens unit having a positive refractive power, a fourth lens unit having a negative refractive power and a fifth lens unit having a positive refractive power, the first and fifth lens units do not move for zooming, the second, third and fourth lens units move to the enlargement side upon zooming from the wide angle end to the telephoto end, the first negative lens and the second negative lens are included in the first lens unit, and the first positive lens is included in the second lens unit.

13. An image projection apparatus comprising:

a display unit that forms an original; and a zoom lens according to claim 1 that projects the original onto a projection surface.

14. An image pickup apparatus comprising:

a solid state image pickup element; and a zoom lens according to claim 1 that forms an image of an object on the solid state image pickup element.

* * * * *